United States Patent (10) Patent No.: US 8,340,283 B2
Nadalin et al. (45) Date of Patent: Dec. 25, 2012

(54) METHOD AND SYSTEM FOR A PKI-BASED DELEGATION PROCESS

(75) Inventors: Anthony Joseph Nadalin, Austin, TX (US); Bruce Arland Rich, Cedar Park, TX (US); Xiaoyan Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 10/881,978

(22) Filed: Jun. 30, 2004

(65) Prior Publication Data
US 2006/0004662 A1 Jan. 5, 2006

(51) Int. Cl.
*H04L 29/06* (2006.01)
(52) U.S. Cl. .............. 380/30; 380/28; 713/164
(58) Field of Classification Search .......... 380/28–30; 713/164–166
See application file for complete search history.

(56) References Cited

U.S. PATENT DOCUMENTS

| | | | |
|---|---|---|---|
| 5,210,795 A * | 5/1993 | Lipner et al. ........... | 713/187 |
| 6,212,634 B1 * | 4/2001 | Geer et al. .............. | 713/156 |
| 6,256,741 B1 * | 7/2001 | Stubblebine ............ | 726/10 |
| 2003/0005286 A1 * | 1/2003 | McGarvey ............... | 713/155 |
| 2004/0260946 A1 * | 12/2004 | Cahill et al. ............ | 713/201 |
| 2005/0108575 A1 * | 5/2005 | Yung ....................... | 713/201 |

OTHER PUBLICATIONS

Boris Loza (Jul. 2000). Network security with Kerberos. Inside Solaris, 6(7), 8-12. Retrieved Jul. 31, 2007, from ProQuest Computing database. (Document ID: 54961973).*
J. Kohl, C. Neuman. Network Working Group. Request for Comments: 1510. Digital Equipment Corporation. Sep. 1993.*
Menezes, Alfred J. Handbook of Applied Cryptography- "Chapter 12: Key Establishment Protocols", CRC Press. Boca Raton. 1997, pp. 500-502, 516-517.*

* cited by examiner

*Primary Examiner* — Kim Vu
*Assistant Examiner* — Randal Moran
(74) *Attorney, Agent, or Firm* — Hamilton & Terrile, LLP; Stephen A. Terrile

(57) ABSTRACT

A client generates a session key and a delegation ticket containing information for a requested delegation operation. The client generates a first copy of the session key and encrypts it using a public key of a proxy. The client generates a second copy of the session key and encrypts it using a public key of a server. The client then puts the encrypted session keys and delegation ticket into a first message that is sent to the proxy. The proxy extracts and decrypts its copy of the session key from the first message. The proxy then encrypts a proof-of-delegation data item with the session key and places it and the delegation ticket along with the encrypted copy of the session key for the server into a second message, which is sent to the server. The server extracts and decrypts its copy of the session key from the second message and uses the session key to obtain the proof-of-delegation data. Authority is successfully delegated to the proxy only if the server can verify the proof-of-delegation data.

24 Claims, 12 Drawing Sheets

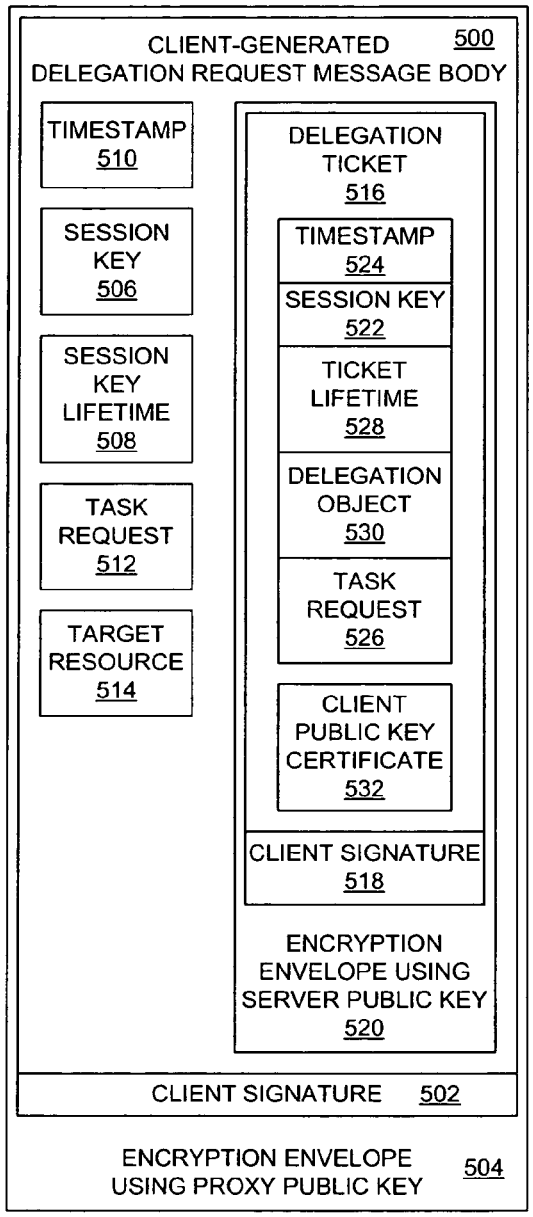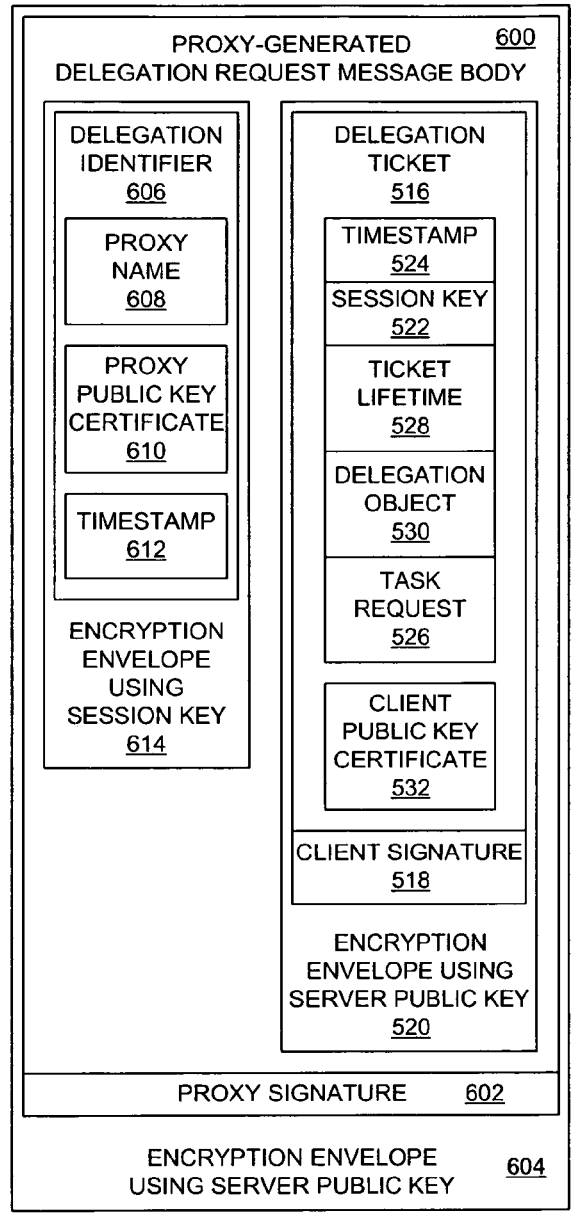
*FIG. 5*  *FIG. 6*

METHOD AND SYSTEM FOR A PKI-BASED DELEGATION PROCESS

BACKGROUND OF THE INVENTION

1. Field of the Invention

The present invention relates to an improved data processing system and, in particular, to a method and apparatus for multicomputer data transferring. Still more particularly, the present invention provides a method and apparatus for multicomputer communication using cryptography.

2. Description of Related Art

Web-based and Internet-based applications have become so commonplace that when one learns of a new product or service, one assumes that information about the product or service can be found on the World Wide Web and that, if appropriate, the product or service will incorporate Internet functionality into the product or service. Many corporations have employed proprietary data services for many years, but it is now commonplace for individuals and small enterprises to have access to digital communication services that operate through the Internet, which has caused the amount of electronic communication on the Internet to grow rapidly.

One of the factors influencing the growth of the Internet is the adherence to open standards for much of the Internet infrastructure. Individuals, public institutions, and commercial enterprises alike are able to introduce new content, products, and services that are quickly integrated into the digital infrastructure of the Internet because of their ability to exploit common knowledge of open standards.

Concerns about the integrity and privacy of electronic communication have also grown with adoption of Internet-based services. Various encryption and authentication technologies have been developed to protect electronic communication. For example, an open standard promulgated for protecting electronic communication is the X.509 standard for digital certificates.

An X.509 digital certificate is an International Telecommunications Union (ITU) standard that has been adopted by the Internet Engineering Task Force (IETF) body. It cryptographically binds the certificate holder, presumably identified by the subject name within the certificate, with the certificate holder's public cryptographic key. This cryptographic binding is based on the involvement of a trusted entity in the Public Key Infrastructure (PKI) called a "certificate authority". As a result, a strong and trusted association between the certificate holder and its public key can become public information yet remain tamper-proof and reliable. An important aspect of this reliability is a digital signature that the certificate authority stamps on a certificate before it is released for use. Subsequently, whenever the certificate is presented to a system for use of a service, its signature is verified before the subject holder is authenticated. After the authentication process is successfully completed, the certificate holder may be provided access to certain information, services, or controlled resources, i.e. the certificate holder may be authorized to access certain systems.

Although PKI-based technology provides robust standards for secure communication, there is no known technique for performing authority delegation based on public/private cryptographic keys and digital certificate technology. Impersonation or authority delegation is a common technique that is used in security systems for enabling a user to allow an entity to temporarily perform some type of operation on behalf of the user upon a computational resource that the user is authorized to access. For example, Kerberos is an authentication system that performs trusted third-party authentication services by using secret-key cryptography. Kerberos provides support for impersonation by allowing users to forward their credentials, e.g., forwardable Kerberos ticket or proxiable Kerberos ticket, to another entity.

Given the usefulness of authority delegation or impersonation, the increasing usefulness of PKI-based solutions, and the lack of a known mechanism for performing PKI-based delegation, it would be advantageous to have a method and system for performing a PKI-based delegation process.

SUMMARY OF THE INVENTION

A method, an apparatus, a system, and a computer program product are presented for delegating authority from a delegating agent to a delegated agent to authorize the delegated agent to act on behalf of the delegating agent with respect to a recognizing agent in order to enable the delegated agent to access computational resources through the recognizing agent.

In one embodiment of the present invention, the delegating agent generates a delegation ticket containing a first delegated agent identifier and a session key copy and encrypts it for the recognizing agent. The delegating agent generates a first delegation request message containing the delegation ticket and another session key copy, encrypts it for the delegated agent, and sends it to the delegated agent. The delegated agent extracts the session key copy and the delegation ticket from the first delegation request message, encrypts a second delegated agent identifier with the session key, places it into a second delegation request message along with the delegation ticket, encrypts the second delegation request message for the recognizing agent, and sends it to the recognizing agent. The recognizing agent decrypts the second delegation request message to extract the encrypted second delegated agent identifier and the delegation ticket, then decrypts the delegation ticket to extract the session key copy from the delegation ticket and the first delegated agent identifier. The recognizing agent also decrypts the encrypted second delegated agent identifier using the session key copy. If the recognizing agent determines that the first delegated agent identifier and the second delegated agent identifier are identical, the recognizing agent sends data that has been encrypted with the session key from the recognizing agent to the delegated agent.

In another embodiment of the present invention, the delegating agent generates a session key, which is used to encrypt a delegation ticket. The delegating agent generates a copy of the session key, which is then encrypted with a public key of the recognizing agent. The delegating agent generates another copy of the session key, which is then encrypted with a public key of the delegated agent. The delegating agent then sends a first message containing the encrypted delegation ticket, the first encrypted session key, and the second encrypted session key to the delegated agent. The delegated agent then decrypts the second encrypted session key with its private key and uses the session key to encrypt data from the delegation ticket to generate an encrypted proof-of-delegation data item. The delegated agent then sends a second message containing the encrypted delegation ticket, the first encrypted session key, and the encrypted proof-of-delegation data item to the recognizing agent. The recognizing agent then decrypts the first encrypted session key with its private key and used the session key to decrypt the encrypted delegation ticket. The recognizing agent also decrypts the encrypted proof-of-delegation data item with the session key to generate the proof-of-delegation data item. If the recognizing agent determines that the proof-of-delegation data item is identical to data within the delegation ticket, the recognizing agent sends data that has been encrypted with the session key from the recognizing agent to the delegated agent.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 5 depicts a block diagram that shows a client-generated delegation request message containing a delegation ticket and other information for accomplishing a PKI-based authority delegation process in accordance with a first embodiment of the present invention;

FIG. 6 depicts a block diagram that shows a proxy-agent-generated delegation request message containing a delegation ticket and other information for accomplishing a PKI-based authority delegation process in accordance with a first embodiment of the present invention;

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
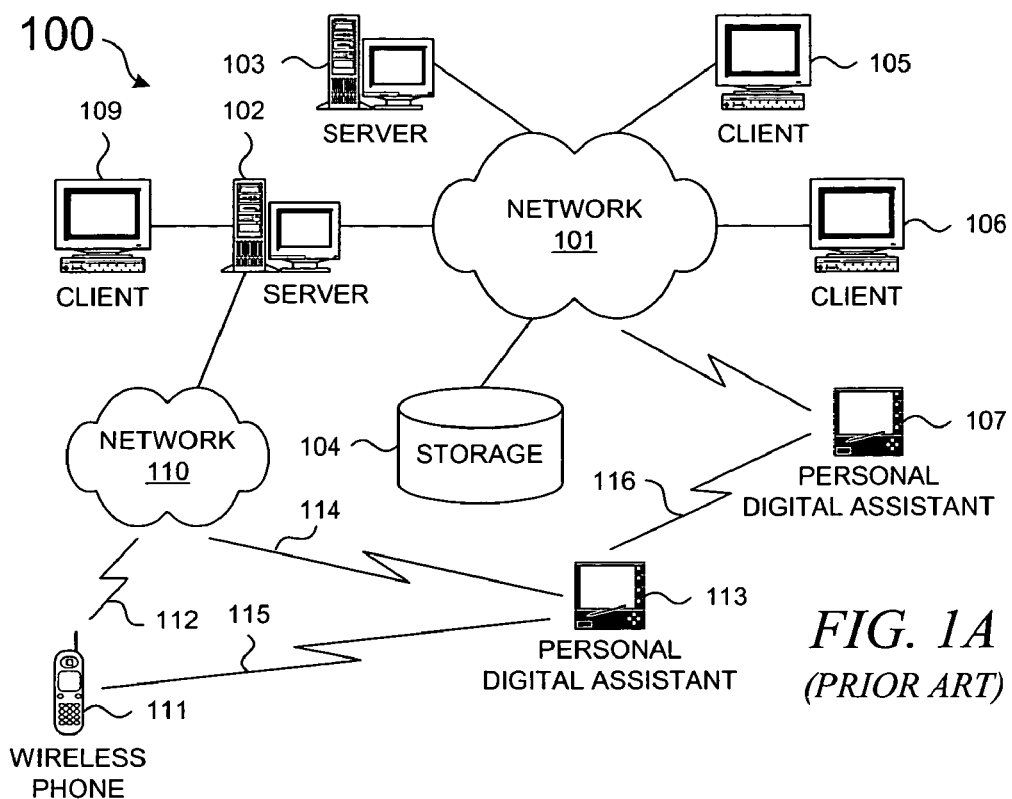
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
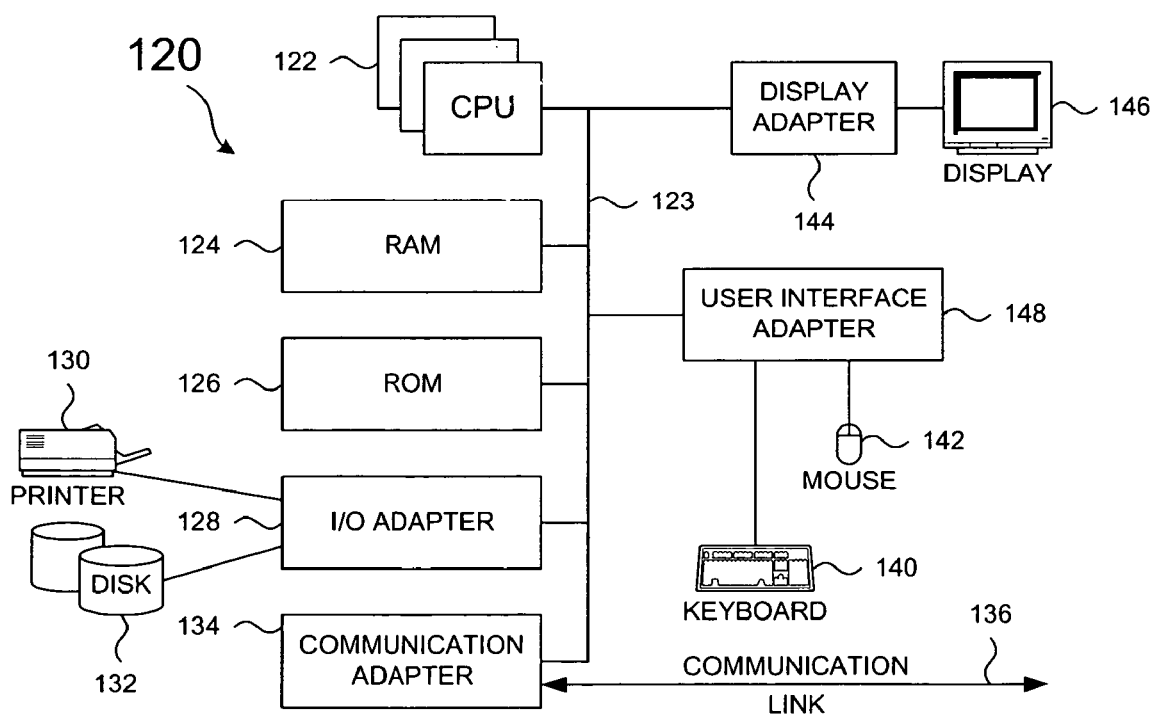
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The descriptions of the figures herein involve certain actions by either a client device or a user of the client device. One of ordinary skill in the art would understand that responses and/or requests to/from the client are sometimes initiated by a user and at other times are initiated automatically by a client, often on behalf of a user of the client. Also, one of ordinary skill in the art would understand that the client stores and processes data items that may be associated with the user in some manner, yet from the perspective of other computational entities, the data items appear to be associated with the client as they originate or terminate transmission with the client. Hence, when a client or a user of a client is mentioned in the description of the figures, it should be understood that the terms "client" and "user" can be used interchangeably without significantly affecting the meaning of the described processes as understood by one having ordinary skill in the art.

The present invention may be implemented on a variety of hardware and software platforms, as described above with respect to FIG. 1A and FIG. 1B. More specifically, though, the present invention is directed to an improved system for authority delegation. Before describing the present invention in more detail, though, some background information about digital certificates is provided for evaluating the operational efficiencies and other advantages of the present invention.

Digital certificates support public key cryptography in which each party involved in a communication or transaction has a pair of keys, called the public key and the private key. Each party's public key is published while the private key is kept secret. Public keys are numbers associated with a particular entity and are intended to be known to everyone who needs to have trusted interactions with that entity. Private keys are numbers that are supposed to be known only to a particular entity, i.e. kept secret. In a typical asymmetric cryptographic system, a private key corresponds to exactly one public key.

Within a public key cryptography system, since all communications involve only public keys and no private key is ever transmitted or shared, confidential messages can be generated using only public information and can be decrypted using only a private key that is in the sole possession of the intended recipient. Furthermore, public key cryptography can be used for authentication, i.e. digital signatures, as well as for privacy, i.e. encryption.

Encryption is the transformation of data into a form unreadable by anyone without a secret decryption key; encryption ensures privacy by keeping the content of the information hidden from anyone for whom it is not intended, even those who can see the encrypted data. Authentication is a process whereby the receiver of a digital message can be confident of the identity of the sender and/or the integrity of the message.

For example, when a sender encrypts a message, the public key of the receiver is used to transform the data within the original message into the contents of the encrypted message. A sender uses a public key of the intended recipient to encrypt data, and the receiver uses its private key to decrypt the encrypted message.

When authenticating data, data can be signed by computing a digital signature from the data using the private key of the signer. Once the data is digitally signed, it can be stored with the identity of the signer and the signature that proves that the data originated from the signer. A signer uses its private key to sign data, and a receiver uses the public key of the signer to verify the signature.

A certificate is a digital document that vouches for the identity and key ownership of entities, such as an individual, a computer system, a specific server running on that system, etc. Certificates are issued by certificate authorities. A certificate authority (CA) is an entity, usually a trusted third party to a transaction, that is trusted to sign or issue certificates for other people or entities. The CA usually has some kind of legal responsibilities for its vouching of the binding between a public key and its owner that allow one to trust the entity that signed a certificate. There are many commercial certificate authorities; these authorities are responsible for verifying the identity and key ownership of an entity when issuing the certificate.

If a certificate authority issues a certificate for an entity, the entity must provide a public key and some information about the entity. A software tool, such as specially equipped Web browsers, may digitally sign this information and send it to the certificate authority. The certificate authority might be a commercial company that provides trusted third-party certificate authority services. The certificate authority will then generate the certificate and return it. The certificate may contain other information, such as a serial number and dates during which the certificate is valid. One part of the value provided by a certificate authority is to serve as a neutral and trusted introduction service, based in part on their verification requirements, which are openly published in their Certification Service Practices (CSP).

A CA creates a new digital certificate by embedding the requesting entity's public key along with other identifying information and then signing the digital certificate with the CA's private key. Anyone who receives the digital certificate during a transaction or communication can then use the public key of the CA to verify the signed public key within the certificate. The intention is that the CA's signature acts as a tamper-proof seal on the digital certificate, thereby assuring the integrity of the data in the certificate.

Other aspects of certificate processing are also standardized. The Certificate Request Message Format (RFC 2511) specifies a format that has been recommended for use whenever a relying party is requesting a certificate from a CA. Certificate Management Protocols have also been promulgated for transferring certificates. The present invention resides in a distributed data processing system that employs digital certificates; the description of FIGS. 2-3 provides background information about typical operations involving digital certificates.

Figure 2:
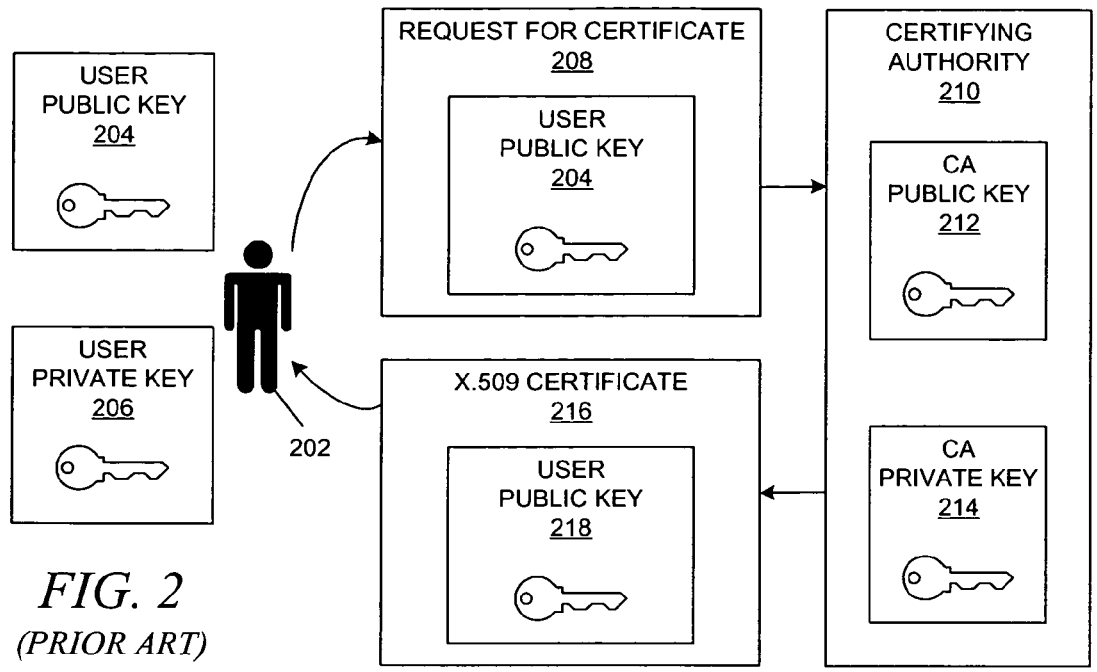
FIG. 2 depicts a block diagram that shows a typical manner in which an individual obtains a digital certificate.

With reference now to FIG. 2, a block diagram depicts a typical manner in which an individual obtains a digital certificate. User 202, operating on some type of client computer, has previously obtained or generated a public/private key pair, e.g., user public key 204 and user private key 206. User 202 generates a request for certificate 208 containing user public key 204 and sends the request to certifying authority 210, which is in possession of CA public key 212 and CA private key 214. Certifying authority 210 verifies the identity of user 202 in some manner and generates X.509 digital certificate 216 containing user public key 218. The entire certificate is signed with CA private key 214; the certificate includes the public key of the user, the name associated with the user, and other attributes. User 202 receives newly generated digital certificate 216, and user 202 may then present digital certificate 216 as necessary to engage in trusted transactions or trusted communications. An entity that receives digital certificate 216 from user 202 may verify the signature of the CA by using CA public key 212, which is published and available to the verifying entity.

Figure 3:
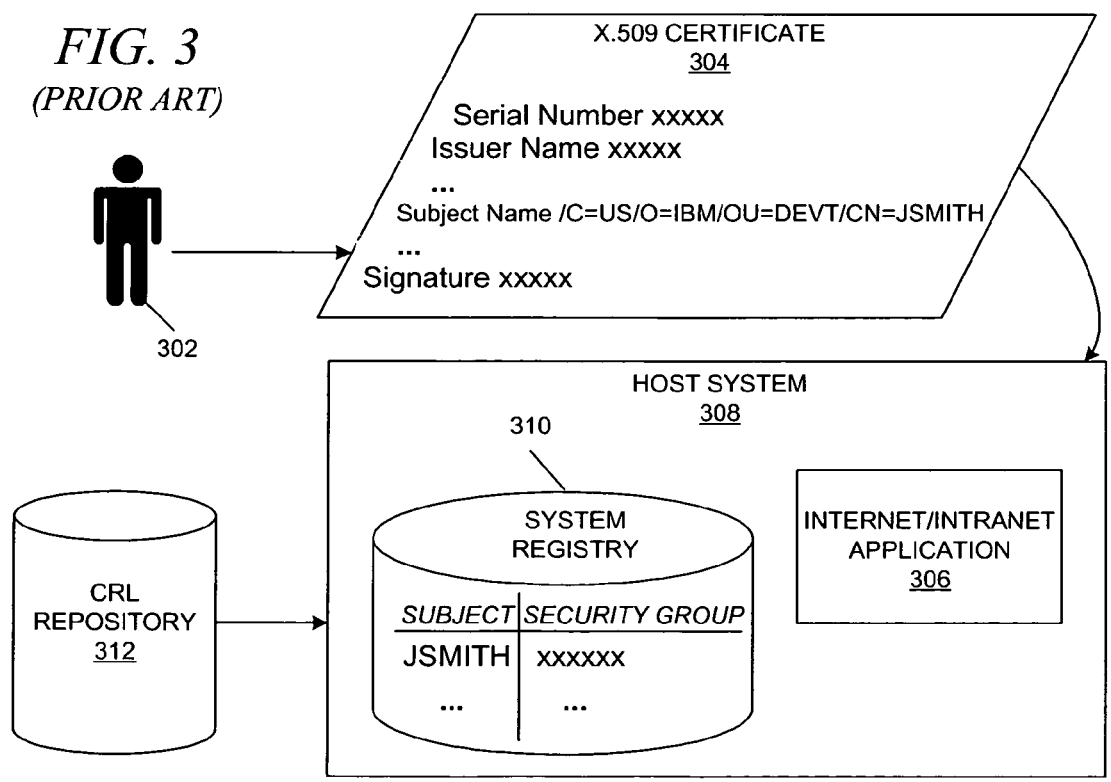
FIG. 3 depicts a block diagram that shows a typical manner in which an entity may use a digital certificate to be authenticated to a data processing system.

With reference now to FIG. 3, a block diagram depicts a typical manner in which an entity may use a digital certificate to be authenticated to a data processing system. User 302 possesses X.509 digital certificate 304, which is transmitted to an Internet or intranet application 306 on host system 308; application 306 comprises X.509 functionality for processing and using digital certificates. User 302 signs or encrypts data that it sends to application 306 with its private key.

The entity that receives certificate 304 may be an application, a system, a subsystem, etc. Certificate 304 contains a subject name or subject identifier that identifies user 302 to application 306, which may perform some type of service for user 302. The entity that uses certificate 304 verifies the authenticity of the certificate before using the certificate with respect to the signed or encrypted data from user 302.

Host system 308 may also contain system registry 310 which is used to authorize user 302 for accessing services and resources within system 308, i.e. to reconcile a user's identity with user privileges. For example, a system administrator may have configured a user's identity to belong to certain a security group, and the user is restricted to being able to access only those resources that are configured to be available to the security group as a whole. Various well-known methods for imposing an authorization scheme may be employed within the system.

In order to properly validate or verify a digital certificate, an application must check whether the certificate has been revoked. When the certifying authority issues the certificate, the certifying authority generates a unique serial number by which the certificate is to be identified, and this serial number is stored within the "Serial Number" field within an X.509 certificate. Typically, a revoked X.509 certificate is identified within a CRL via the certificate's serial number; a revoked certificate's serial number appears within a list of serial numbers within the CRL.

In order to determine whether certificate 304 is still valid, application 306 obtains a certificate revocation list (CRL) from CRL repository 312 and validates the CRL. Application 306 compares the serial number within certificate 304 with the list of serial numbers within the retrieved CRL, and if there are no matching serial numbers, then application 306 validates certificate 304. If the CRL has a matching serial number, then certificate 304 should be rejected, and application 306 can take appropriate measures to reject the user's request for access to any controlled resources.

Given the background information about digital certificates, the description now turns to the present invention, which is directed to an improved system for authority delegation. As mentioned above, impersonation or authority delegation is a common technique that is used in security systems for enabling a user to allow an entity to temporarily perform some type of operation on behalf of the user upon a computational resource that the user is authorized to access. However, there is no known technique for performing authority delegation based on public/private cryptographic keys and digital certificate technology. The present invention provides a solution for performing a PKI-based delegation process, as explained in more detail hereinbelow with respect to the remaining figures.

Figure 4A:
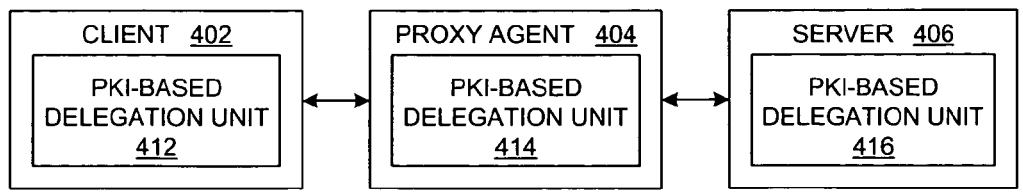
FIG. 4A depicts a block diagram that shows a system for a PKI-based delegation of authority.

With reference now to FIG. 4A, a block diagram depicts a system for a PKI-based delegation of authority in accordance with an embodiment of the present invention. Client 402 delegates client/user authority to proxy agent 404 such that proxy agent 404 may act on behalf of, i.e. impersonate, the client/user with respect to server 406 for accessing resources that are protected or controlled by server 406; proxy agent 404 and server 406 may execute on the same host machine or physical device as client 402 or on a different device. In accordance with the present invention, client 402, proxy agent 404, and server 406 have been extended to comprise PKI-based delegation units 412, 414, and 416, respectively, which contain logic for accomplishing the authority delegation process using a PKI-based technique in accordance with the present invention. Alternatively, the client, the proxy agent, and the server may be termed the delegating agent, the impersonating or delegated agent, and the recognizing agent, respectively.

Figure 4B:
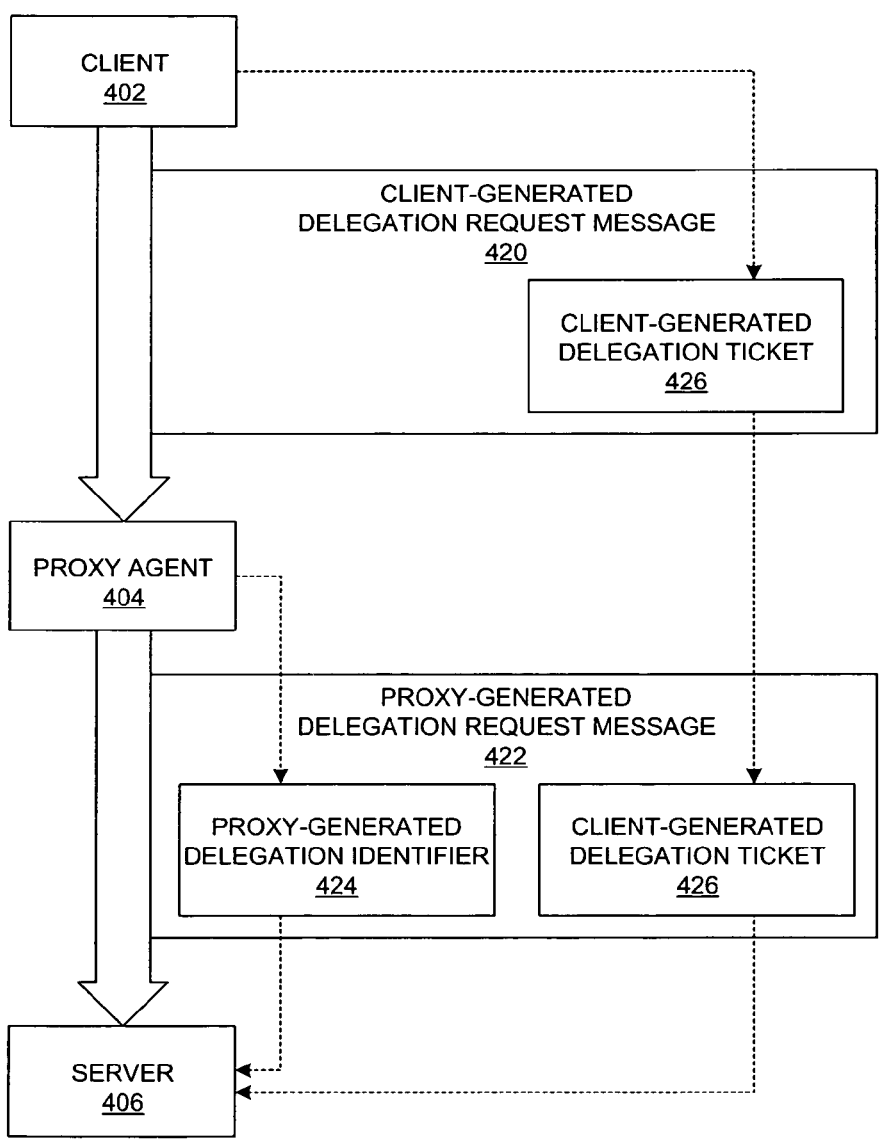
FIG. 4B depicts a block diagram that shows a transfer of information within a system for a PKI-based delegation of authority.

With reference now to FIG. 4B, a block diagram depicts a transfer of information within a system for a PKI-based delegation of authority. Similar reference numerals in FIG. 4A and FIG. 4B refer to similar entities; whereas FIG. 4B is similar to FIG. 4A, FIG. 4B illustrates some of the data flow between the entities that are associated with a PKI-based delegation process.

As explained in more detail hereinbelow, client-generated delegation request message 420 is sent from client 402 to proxy agent 404 to initiate an authority delegation process. Proxy-generated delegation request message 422 is sent from proxy agent 404 to server 406 to continue an authority delegation process that has been initiated by client 402. Proxy-generated delegation request message 422 contains proxy-generated delegation identifier 424, which carries information about proxy agent 404 from proxy agent 404 to server 406. In addition, FIG. 4B particularly illustrates that client-generated delegation request message 420 contains client-generated delegation ticket 426 that is to be used by target server 406, and delegation ticket 426 remains unmodified by proxy agent 404 as it is forwarded by proxy agent 404 to server 406 while accompanied by delegation identifier 424. Client-generated delegation request message 420 and proxy-generated delegation request-message 422 may have any appropriate data format, such as ASN.1 encoded data; a delegation request message may be organized to include a request message header and a request message body, e.g., wherein the message header includes a message type indicator and a message length value.

With reference now to FIG. 5, a block diagram depicts a client-generated delegation request message containing a delegation ticket and other information for accomplishing a PKI-based authority delegation process in accordance with a first embodiment of the present invention. Client-generated delegation request message body 500 is contained within a client-generated request message that is sent from a client to a proxy agent to initiate an authority delegation process. Client-generated delegation request message body 500 is signed by the client, i.e. the client creates a digital signature on client-generated delegation request message body 500, as shown by the inclusion of the client's digital signature 502. In addition, client-generated delegation request message body 500 is encrypted with the proxy agent's public key, as shown by the inclusion of encryption envelope 504 that has been created with the proxy agent's public key; alternatively, the delegation request message body could be encrypted and then signed rather than being signed and then encrypted as shown in FIG. 5.

Client-generated delegation request message body 500 contains several data items to be extracted and used by the proxy agent. Session key 506 is a symmetric cryptographic key or secret key that is generated by the client to be used for communication between the client, the proxy, and the server after establishing the authority delegation; although session key 506 is essential, the other data items are not essential. Session key lifetime value 508 is a time value that restricts the usable time period of session key 506. Timestamp 510 reflects a current time value, i.e. the time when the message is generated, which in conjunction with session key lifetime value 508 allows an entity to determine the time at which session key 506 expires. Alternatively, a session key may comprise a data bundle that includes a key value with a key expiration time, a key type (e.g., DES, triple DES, etc.).

Task request 512 informs the proxy agent about the type of task that the client is requesting that the proxy agent perform on behalf of the client and for which the client is delegating authority to the proxy; if task request 512 is not present in delegation request message body 500, the client and the proxy agent may subsequently communicate to identify the tasks that are to be performed. Target resource 514 identifies a particular resource on which the proxy agent will perform the delegated task, e.g., using a URI (Uniform Resource Identifier); the client and the proxy agent may subsequently communicate to identify additional tasks and target resources that are to be processed within a given delegation session.

Client-generated delegation request message body 500 also contains several data items embedded in a delegation ticket that is to be extracted and used by the target server. Delegation ticket 516 is signed by the client, as shown by the inclusion of the client's digital signature 518. In addition, delegation ticket 516 is encrypted with the server's public key, as shown by the inclusion of encryption envelope 520 that has been created with the server's public key; alternatively, the delegation ticket could be encrypted and then signed rather than being signed and then encrypted as shown in FIG. 5. Delegation ticket 516 contains copies of some data items that are contained in client-generated delegation request message body 500 for use by the proxy agent, such as session key 522, timestamp 524, and task request 526. Ticket lifetime 528 is a time value that restricts the usable time period of the delegation of authority which, in conjunction with timestamp 524, allows an entity to determine the time at which the delegation period expires. Delegation object 530 identifies the object to which authority is being delegated, i.e. the proxy agent that will act on behalf of the client/user; delegation object 530 may contain an identifier for the proxy agent, in particular, the subject name for the proxy agent that would be found within the proxy agent's public key certificate. Certificate 532 is a copy of the client's public key certificate. Session key 522 must be identical to session key 506; a target resource identifier may also be included (not shown).

Although session key 522 and delegation object 530 are essential data items, the other data items are non-essential or may be transmitted at a subsequent point in time after the establishment of the delegation session, although it is much more efficient to provide the data items during the initial transmission or request while the delegation session is being created. For example, if client public key certificate 532 were not included in the delegation ticket, then the target server would have to perform additional work and would be inconvenienced to find and retrieve a copy of client public key certificate 532 before it could verify the client's digital signature.

With reference now to FIG. 6, a block diagram depicts a proxy-agent-generated delegation request message containing a delegation ticket and other information for accomplishing a PKI-based authority delegation process in accordance with a first embodiment of the present invention. Proxy-agent-generated delegation request message body 600 is contained within a proxy-generated request message that is sent from a proxy agent to a server to continue an authority delegation process that has been initiated by a client. Proxy-generated delegation request message body 600 is signed by the proxy, as shown by the inclusion of the proxy's digital signature 602. In addition, proxy-generated delegation request message body 600 is optionally encrypted with the server's public key, as shown by the inclusion of encryption envelope 604 that has been created with the server's public key; alternatively, the delegation request message body could be encrypted and then signed rather than being signed and then encrypted as shown in FIG. 6.

Proxy-generated delegation request message body 600 contains some information that has been copied or carried over from a client-generated delegation request message body that would have been received by a proxy agent from a client, e.g., such as client-generated delegation request message body 500 that is shown in FIG. 5. Hence, similar reference numerals that are shown in proxy-generated delegation request message body 600 refer to similar data items that were described above with respect to client-generated delegation request message body 500; proxy-generated delegation request message body 600 also contains several data items that are embedded in a delegation ticket that would have been created by a client for extraction and use by the target server.

In addition, proxy-generated delegation request message body 600 also contains other data items that are generated by the proxy agent for use by the target server. In particular, delegation identifier 606 contains an identifier or name 608 for the proxy agent, which should match the identifier for the proxy agent that has been used within delegation object 530, e.g., the subject name for the proxy agent that would be found within the proxy agent's public key certificate. Hence, delegation identifier 606 also preferably contains a copy of the proxy agent's public key certificate 610; timestamp 612 is optionally included to prevent a replay attack. Delegation identifier 606 is encrypted by the proxy agent using session key 506 that the proxy agent has received from the client in client-generated delegation request message body 500, as shown by the inclusion of encryption envelope 614 that has been created with the session key.

In a preferred embodiment, delegation identifier 606 and delegation ticket 516 within proxy-generated delegation request message body 600 are both encrypted, and proxy-generated delegation request message body 600 does not contain any other sensitive information in clear text; hence, a malicious user would not be able to extract useful information from proxy-generated delegation request message body 600 if a malicious user were to obtain a copy of proxy-generated delegation request message body 600. Therefore, the encryption of proxy-generated delegation request message body 600 with the server's public key, as shown by the inclusion of encryption envelope 604, would not be necessary unless, in an alternative embodiment, clear text information were embedded in proxy-generated delegation request message body 600.

Figure 7A:
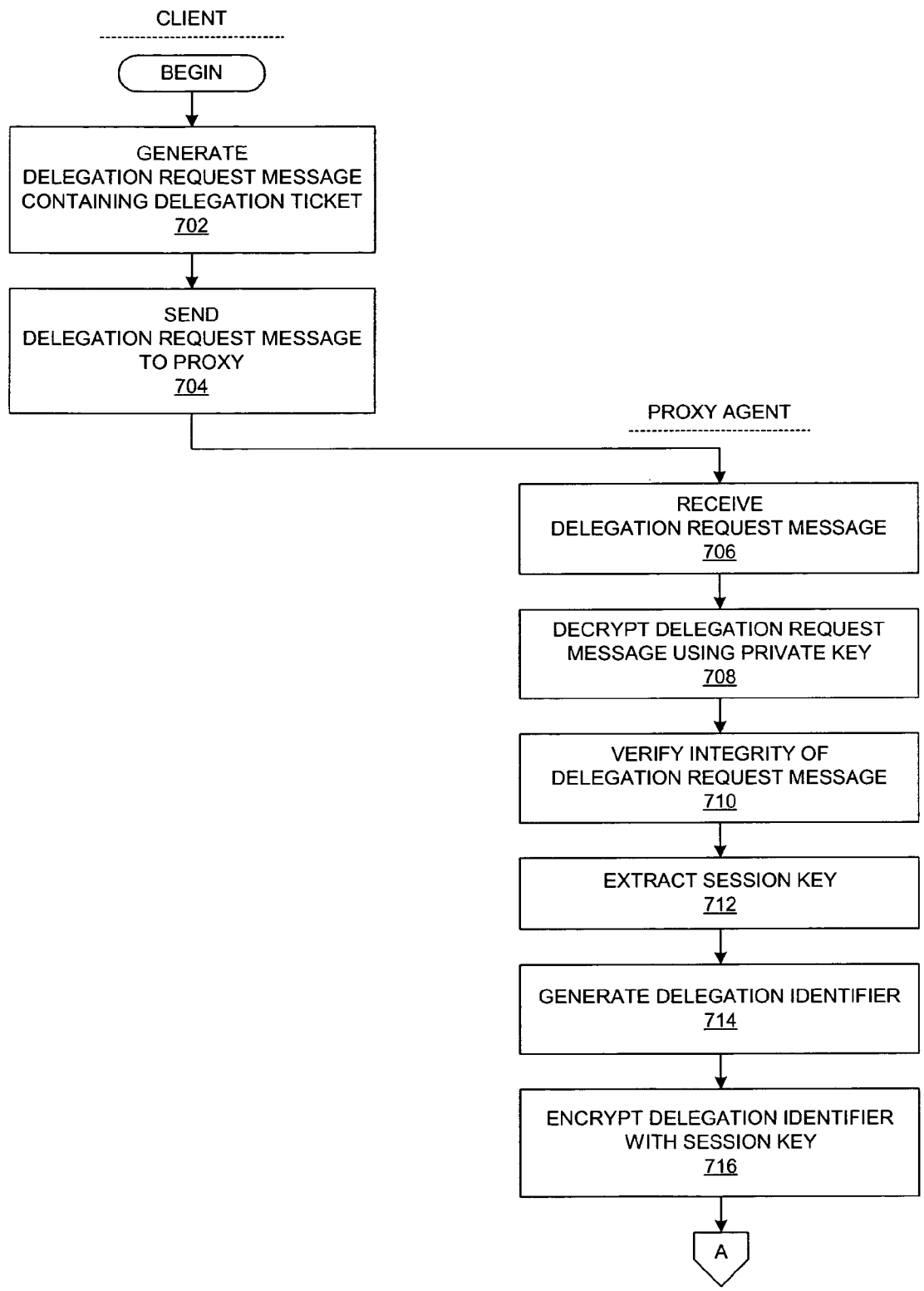
FIGS. 7A-7B depict a flowchart that shows a PKI-based authority delegation process in accordance with a first embodiment of the present invention.
Figure 7B:
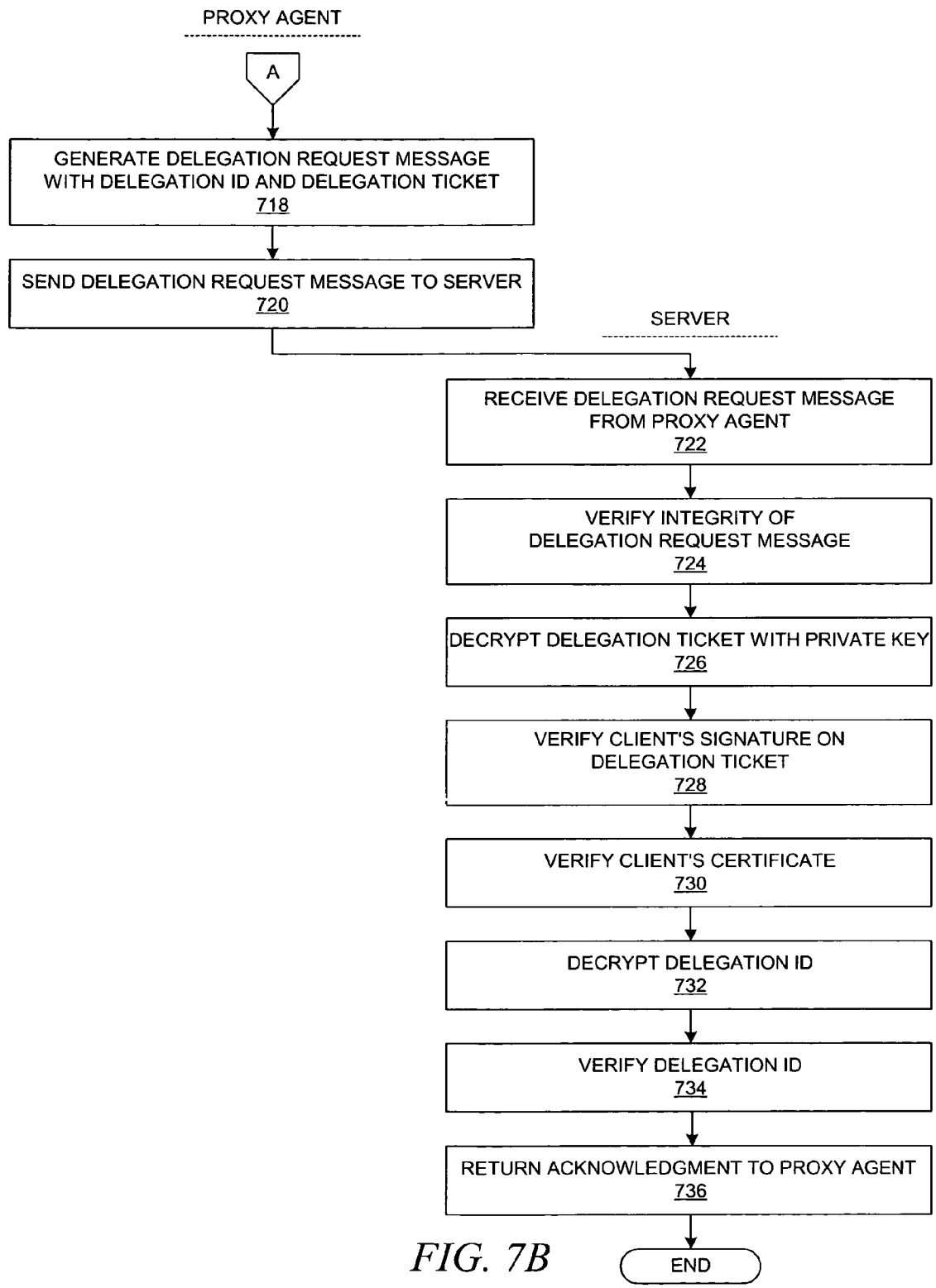

With reference now to FIGS. 7A-7B, a flowchart depicts a PKI-based authority delegation process in accordance with a first embodiment of the present invention. The process that is shown in FIG. 7A and FIG. 7B depicts a client/user entity that is attempting to delegate authority to a proxy agent that is to act on behalf of the client/user with a target server. The process that is shown in FIG. 7A and FIG. 7B assumes the usage of examples of a delegation request message body as shown in FIG. 5 and FIG. 6; however, a similar process would be used for alternative embodiments, as described in more detail further below. If the authority delegation process is successfully completed, then the server accepts and processes transaction requests from the proxy agent. In FIG. 7A and FIG. 7B, a delegation request message body would be included as part of a message that may have other parts, as described above.

The process commences when the client generates a signed delegation request message body that contains a delegation ticket along with additional information (step 702), e.g., as shown in client-generated delegation request message body 500 that is depicted in FIG. 5. The client then sends the delegation request message to the proxy agent (step 704).

After the proxy agent receives the delegation request message (step 706), the proxy agent decrypts the delegation request message body using its private key (step 708) and verifies the integrity of the delegation request message body by checking the client's digital signature on the delegation request message body (step 710). Assuming that the decryption and verification are successful, the proxy agent extracts the session key and other information from the delegation request message body (step 712). The proxy agent then generates a delegation identifier (step 714) and encrypts the delegation identifier with the session key that was received from the client (step 716). The proxy agent bundles the encrypted delegation identifier with the encrypted delegation ticket into a signed delegation request message body (step 718), which is sent to the target server (step 720).

After the server receives the signed delegation request message body from the proxy agent (step 722), the server verifies the integrity of the delegation request message body by checking the proxy agent's digital signature on the delegation request message body (step 724). Assuming that the verification is successful, the server decrypts the delegation ticket with its private key (step 726). The server then verifies the client's digital signature on the delegation ticket (step 728) and also verifies the client's digital certificate (step 730). The server also checks that the ticket lifetime is valid and that the task request is valid; other included information may be validated as necessary.

Assuming that the data items within the delegation ticket are successfully validated, the server decrypts the delegation identifier using the previously decrypted session key from the delegation ticket (step 732). The server then verifies that the proxy agent identifier in the delegation identifier matches the proxy agent identifier in the delegation object of the delegation ticket (step 734). Assuming that the server determines that the client and the proxy agent have successfully interacted to produce the delegation identifier and the delegation ticket, then the server returns to the proxy agent some data that has been encrypted with the session key (step 736), thereby concluding the process.

The first series of returned data may be the result of completing a requested task, or the returned data may be a simple acknowledgment; in any case, the receipt of session-key-encrypted data at the proxy agent acts as an acknowledgment that the delegation session has been successfully created. If the server has enough information to perform a task for the proxy agent upon receipt of the delegation ticket, e.g., from a task request and possibly a target resource identifier, then the server might perform the task and immediately return the results of the requested task. Alternatively, the server might initially return an acknowledgment to the proxy agent and wait for a subsequent task request.

The task request identifier in the delegation ticket may be used as merely an identifier for the initial task to be performed. Alternatively, the server may regard the task request identifier as an indication of a restriction on the authority that the client has delegated to the proxy agent; thus, any subsequent requests from the proxy agent that do not match the initially authorized task might be rejected by the server. In this manner, the proxy agent would only be authorized to request a single type of task, although the proxy agent would be authorized to request the task over multiple target resources. Alternatively, the task request information in the delegation ticket may comprise a list of authorized tasks or classes of tasks such that the client is able to delegate authority to the proxy agent for a wide variety of operations.

The advantages of the present invention should be apparent in view of the detailed description that is provided above. The present invention provides a solution for performing a PKI-based delegation process. With respect to the delegation request message from the client to the proxy agent, the delegation request message is encrypted with the proxy agent's public key, so only the proxy agent can decrypt the delegation request message. Since the delegation request message is signed by the client/user, the proxy server can verify that it was created by the client. The lifetime limitation on the session key reduces the risk of the session key being compromised and misused.

With respect to the delegation ticket, it is encrypted with the target server's public key, so only the target server can decrypt the delegation ticket, thereby preventing the proxy agent or a malicious party from access and/or manipulating the content of the delegation ticket. Moreover, since the delegation ticket is signed by the client/user, the target server can verify that the delegation ticket was created by the client. In addition, the lifetime period on the delegation ticket restricts its validity to a particular time period, which somewhat prevents replay attacks.

The delegation identifier also ensures that the delegation ticket is received at the server through the proper party, i.e. through the proxy agent that was intended by the client. For example, the proxy agent must have identified itself within the delegation identifier in the same manner as the client identified the proxy agent within the delegation ticket, i.e. via the delegation object. Since the delegation ticket was encrypted with the server's public key, only the server would be able to view the identity of the intended proxy agent, which somewhat prevents a malicious party from spoofing the identity of the proxy agent if the delegation ticket were to have been disclosed to the malicious party. If the malicious party were to know the identity of the intended proxy agent by acting as a man-in-the-middle between the client and the proxy agent, then the malicious party would not be able to obtain the session key that is needed to encrypt the delegation identifier; since the session key in the client-generated delegation request message is encrypted with the proxy agent's public key, the malicious user would not be able to obtain the session key that is required to encrypt the delegation identifier. In this manner, the session key and the delegation identifier provide enough authentication information for the proxy agent such that the authority delegation operation can be performed without an SSL connection. However, if a secure communication channel is used between the proxy agent and the target server, e.g., over SSL, then in an alternative embodiment, the delegation identifier would not be necessary.

Figure 8:
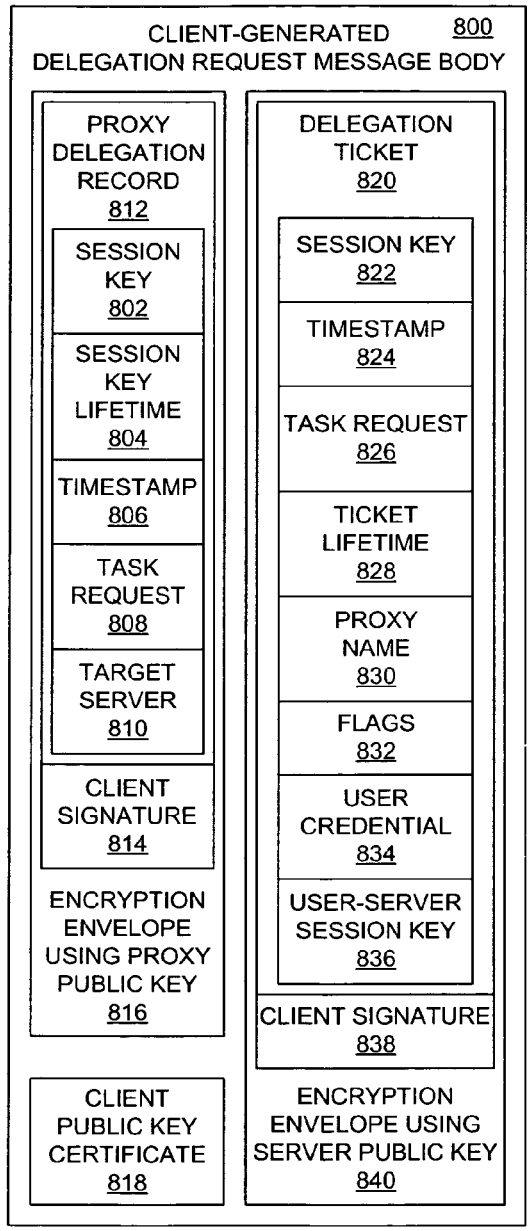
FIG. 8 depicts a block diagram that shows a client-generated delegation request message containing a delegation ticket and other information for accomplishing a PKI-based authority delegation process in accordance with a second embodiment of the present invention.

With reference now to FIG. 8, a block diagram depicts a client-generated delegation request message containing a delegation ticket and other information for accomplishing a PKI-based authority delegation process in accordance with a second embodiment of the present invention. Client-generated delegation request message body 800 is contained within a client-generated request message that is sent from a client to a proxy agent to initiate an authority delegation process. Client-generated delegation request message body 800 contains several data items 802-810 to be extracted and used by the proxy agent. Data items 802-810 are bundled into proxy delegation record 812, which is signed by the client, i.e. the client creates a digital signature on proxy delegation record 812, as shown by the inclusion of the client's digital signature 814. In addition, proxy delegation record 812 is encrypted with the proxy agent's public key, as shown by the inclusion of encryption envelope 816 that has been created with the proxy agent's public key; alternatively, proxy delegation record 812 could be encrypted and then signed rather than being signed and then encrypted as shown in FIG. 8.

As mentioned above, proxy delegation record 812 contains several data items. Session key 802 is a symmetric cryptographic key or secret key that is generated by the client to be used for communication between the client, the proxy, and the server after establishing the authority delegation; although session key 802 is essential, the other data items are not essential. Session key lifetime value 804 is a time value that restricts the usable time period of session key 802. Timestamp 806 reflects a current time value, i.e. the time when the message is generated, which in conjunction with session key lifetime value 804 allows an entity to determine the time at which session key 802 expires. Alternatively, a session key may comprise a data bundle that includes a key value with a key expiration time, a key type (e.g., DES, triple DES, etc.).

Task request 808 informs the proxy agent about the type of task that the client is requesting that the proxy agent perform on behalf of the client and for which the client is delegating authority to the proxy; if task request 808 is not present in delegation request message body 800, the client and the proxy agent may subsequently communicate to identify the tasks that are to be performed. Target server 810 identifies a particular server with respect to which the proxy agent will perform the delegated task; the client and the proxy agent may subsequently communicate to identify additional tasks and target resources that are to be processed within a given delegation session.

Client-generated delegation request message body 800 may also contain certificate 818, which is a copy of the client's/user's public key certificate; this may be included for convenience since the proxy agent may be able to retrieve a copy of the client's/user's public key certificate from a public source, e.g., an LDAP directory that is commonly used by the proxy agent and the client.

In addition, client-generated delegation request message body 800 contains several data items 822-836 embedded in delegation ticket 820, which is to be extracted and used by the target server. Delegation ticket 820 is signed by the client, as shown by the inclusion of the client's digital signature 838. Delegation ticket 820 is encrypted with the server's public key, as shown by the inclusion of encryption envelope 840 that has been created with the server's public key; alternatively, the delegation ticket could be encrypted and then signed rather than being signed and then encrypted as shown in FIG. 8.

Delegation ticket 820 contains copies of some data items that are contained in client-generated delegation request message body 800 for use by the proxy agent, such as session key 822, timestamp 824, and task request 826. Ticket lifetime 828 is a time value that restricts the usable time period of the delegation of authority which, in conjunction with timestamp 824, allows an entity to determine the time at which the delegation period expires. Proxy name 830 identifies the proxy to which authority is being delegated, i.e. the proxy agent that will act on behalf of the client/user; proxy name 830 may contain an identifier for the proxy agent, e.g., the subject name for the proxy agent that would be found within the proxy agent's public key certificate. Session key 822 must be identical to session key 802; a target resource identifier may also be included (not shown).

Although session key 822 and proxy name 830 are essential data items, the other data items are non-essential or may be transmitted at a subsequent point in time after the establishment of the delegation session, although it is much more efficient to provide the data items during the initial transmission or request while the delegation session is being created. For example, other non-essential data items may include processing flags 832, which instruct the target server of the processing options that are requested by the client for the requested task. In addition, user credential 834 and user-server session key 836 are embedded within delegation ticket 820 and protected by encryption such that the target server can obtain these data items but not the delegated/proxy agent. User credential 834, e.g., a username and associated password, may be used by the target server during an authentication operation to provide an extra level of security. User-server session key 836 differs from session key 822 (which is identical to session key 802); since the delegated/proxy agent would not have a copy of user-server session key 836, user-server session key 836 can be used by the target server and the client to communicate securely without the possibility of the delegated/proxy agent being able to view the data, thereby providing yet another level of security for communication between the client and the target server.

Figure 9:
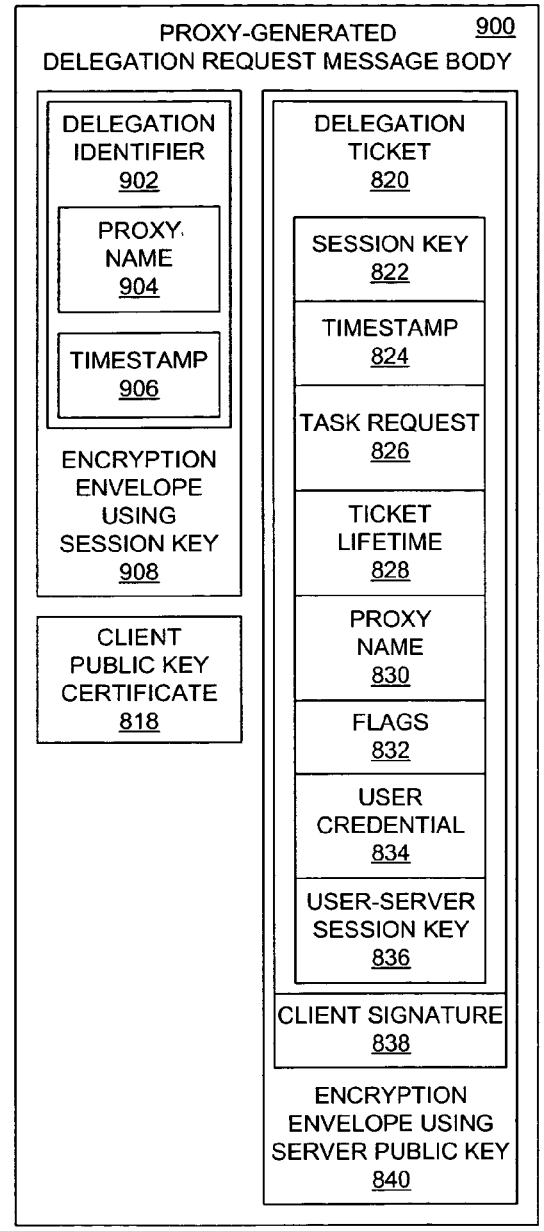
FIG. 9 depicts a block diagram that shows a proxy-agent-generated delegation request message containing a delegation ticket and other information for accomplishing a PKI-based authority delegation process in accordance with a second embodiment of the present invention.

With reference now to FIG. 9, a block diagram depicts a proxy-agent-generated delegation request message containing a delegation ticket and other information for accomplishing a PKI-based authority delegation process in accordance with a second embodiment of the present invention. Proxy-agent-generated delegation request message body 900 is contained within a proxy-generated request message that is sent from a proxy agent to a server to continue an authority delegation process that has been initiated by a client. Proxy-generated delegation request message body 900 contains some information that has been copied or carried over from a client-generated delegation request message body that would have been received by a proxy agent from a client, e.g., such as client-generated delegation request message body 800 that is shown in FIG. 8; this information was intended to be sent by the client to the target server as the destination. More specifically, proxy-generated delegation request message body 900 contains client public key certificate 818 and several data items that are embedded in a delegation ticket that would have been created by a client for extraction and use by the target server. Hence, similar reference numerals that are shown in proxy-generated delegation request message body 900 refer to similar data items that were described above with respect to client-generated delegation request message body 800.

In addition, proxy-generated delegation request message body 900 contains other data items that are generated by the proxy agent for use by the target server. In particular, delegation identifier 902 contains an identifier or proxy name 904 for the proxy agent, which should match the identifier for the proxy agent that has been used within proxy name 830 in delegation ticket 820, e.g., the subject name for the proxy agent that would be found within the proxy agent's public key certificate. Timestamp 906 is optionally included to prevent a replay attack. Delegation identifier 902 is encrypted by the proxy agent using session key 802 that the proxy agent has received from the client in client-generated delegation request message body 800, as shown by the inclusion of encryption envelope 908 that has been created with the session key.

In a preferred embodiment, delegation identifier 902 and delegation ticket 820 within proxy-generated delegation request message body 900 are both encrypted, and proxy-generated delegation request message body 900 does not contain any other sensitive information in clear text; hence, a malicious user would not be able to extract useful information from proxy-generated delegation request message body 900 if a malicious user were to obtain a copy of proxy-generated delegation request message body 900.

The client, the proxy agent, and the target server may exchange messages as described above with respect to FIG. 8 and FIG. 9 when a client/user entity is attempting to delegate authority to a proxy agent that is to act on behalf of the client/user with respect a target server; if the authority delegation process is successfully completed, then the server accepts and processes transaction requests from the proxy agent. As noted above, the process that is shown in FIG. 7A and FIG. 7B assumes the usage of examples of a delegation request message body as shown in FIG. 5 and FIG. 6, but a similar process would be used for alternative embodiments, e.g., using the examples of a delegation request message body as shown in FIG. 8 and FIG. 9 as described hereinbelow.

The process commences when the client generates a delegation request message that contains signed delegation ticket 820 along with additional information, e.g., as shown in client-generated delegation request message body 800 that is depicted in FIG. 8. The client then sends the client-generated delegation request message to the proxy agent.

After the proxy agent receives the delegation request message, the proxy agent decrypts proxy delegation record 812 using its private key and verifies the integrity of proxy delegation record 812 by checking the client's digital signature on proxy delegation record 812. Assuming that the decryption and verification are successful, the proxy agent extracts session key 802 and other information from proxy delegation record 812. The proxy agent then generates delegation identifier 902 and encrypts delegation identifier 902 with session key 802 that was received from the client. The proxy agent bundles the encrypted delegation identifier with the encrypted delegation ticket into delegation request message body 900, which is sent to the target server as a proxy-generated delegation request message.

After the server receives the delegation request message from the proxy agent, the server decrypts delegation ticket 820 with its private key. Assuming that the decryption is successful, the server verifies the integrity of delegation ticket 820 by checking client's digital signature 838 on delegation ticket 820. The server may also check that the ticket lifetime is valid and that the task request is valid; other included information may be validated as necessary.

Assuming that the verification of the delegation ticket is successful, the target server can then extract session key 822 from delegation ticket 820. Given session key 822, the server decrypts delegation identifier 902 using this session key. The server then verifies that proxy agent identifier 904 in delegation identifier 902 matches proxy agent identifier 830 in delegation ticket 820. Assuming that the server determines that the client and the proxy agent have successfully interacted to produce the delegation identifier and the delegation ticket, then the server returns to the proxy agent some data that has been encrypted with the session key, thereby concluding the process.

The advantages of the second embodiment of the present invention compared to the first embodiment of the present invention should be apparent in view of the detailed description that is provided above. Most importantly, the process is more efficient because the proxy agent's digital signature is not used in the proxy-generated delegation request message to the target server. Thus, the target server does not need to build a certification path for the proxy's public key certificate in an attempt to verify the proxy's public key certificate. This advantage is increased in the third embodiment of the present invention, which is described hereinbelow with respect to the remaining figures.

Figure 10:
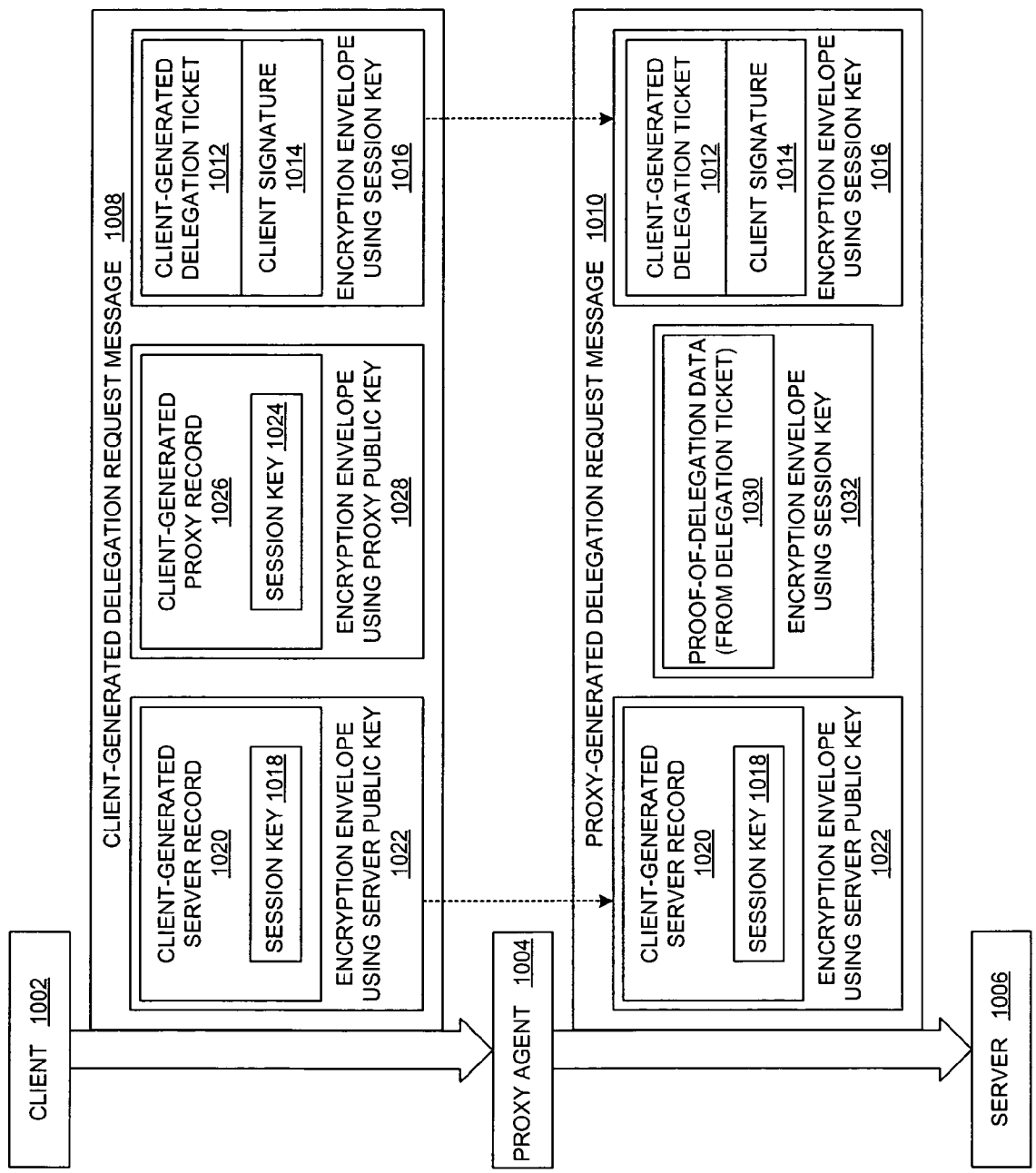
FIG. 10 depicts a block diagram that shows a transfer of information within a system for a PKI-based delegation of authority in accordance with a third embodiment of the present invention.

With reference now to FIG. 10, a block diagram depicts a transfer of information within a system for a PKI-based delegation of authority in accordance with a third embodiment of the present invention. In a manner similar to that explained above, client/user (delegating entity) 1002 delegates authority to proxy agent (delegated entity) 1004 such that proxy agent 1004 can act on behalf of client/user 1002 with respect to target server 1006. Again, in a manner similar to that described above, client 1002 initiates the delegation operation with proxy agent 1004 by sending client-generated delegation request message 1008 to proxy agent 1004; proxy agent 1004 initiates the completion of the delegation operation with target server 1006 by sending proxy-generated delegation request message 1010 to target server 1006. Client-generated delegation request message 1008 and proxy-generated delegation request message 1010 may have any appropriate data format, such as ASN.1 encoded data; a delegation request message may be organized to include a request message header and a request message body, e.g., wherein the message header includes a message type indicator and a message length value. Although there are some similarities, the third embodiment of the present invention that is shown in FIG. 10 differs from the embodiments that were discussed above, as discussed hereinbelow.

Client-generated delegation ticket 1012 is signed by client 1002 using the client's private key, which is shown in FIG. 10 with client signature 1014; client-generated delegation ticket 1012 is then encrypted using the session key, which is shown in FIG. 10 with encryption envelope 1016. Thus, the information that is contained within the delegation ticket is available to any entity that has a copy of the session key. Client 1002 then provides a copy of the session key to both proxy agent 1004 and target server 1006, thereby enabling proxy agent 1004 and target server 1006 to use the data items in delegation ticket 1012 to configure the authority delegation operation.

To protect the identical copies of the session key, each copy of the session key is encrypted such that only the intended recipient may use its copy of the session key. Client 1002 places copy 1018 of the session key that is intended for target server 1006 in client-generated server record 1020, which is encrypted with the server's public key, which is shown in FIG. 10 with encryption envelope 1022; client-generated server record 1020 may contain other information, as discussed below with respect to FIG. 11. Client 1002 places copy 1024 of the session key that is intended for proxy agent 1004 in client-generated proxy record 1026, which is encrypted with the proxy agent's public key, which is shown in FIG. 10 with encryption envelope 1028; client-generated server record 1026 may contain other information, as discussed below with respect to FIG. 11. Hence, proxy agent 1004 and target server 1006 are able to obtain their respective copies of the session key by decrypting the encrypted copies using their respective private keys.

In response to receiving client-generated delegation request message 1008, proxy agent 1004 performs some amount of set-up to prepare for the operations that it will perform for the delegated authority that it possesses for client 1002; for example, since proxy agent 1004 may perform proxying operations on behalf of many different clients, proxy agent 1004 might store the session key in association with identifying information for client 1002. At some point in time thereafter, proxy agent 1004 continues the requested authority delegation operation by sending proxy-generated delegation request message 1010 to target server 1006. Proxy agent 1004 forwards the information that was generated by client 1002 and intended for receipt by target server 1006, i.e. delegation ticket 1012 and client-generated server record 1020. FIG. 10 particularly illustrates that client-generated delegation request message 1008 contains client-generated delegation ticket 1012 that is to be used by target server 1006, and delegation ticket 1012 and server record 1020 remain unmodified by proxy agent 1004 as they are forwarded by proxy agent 1004 to target server 1006.

Figure 12:
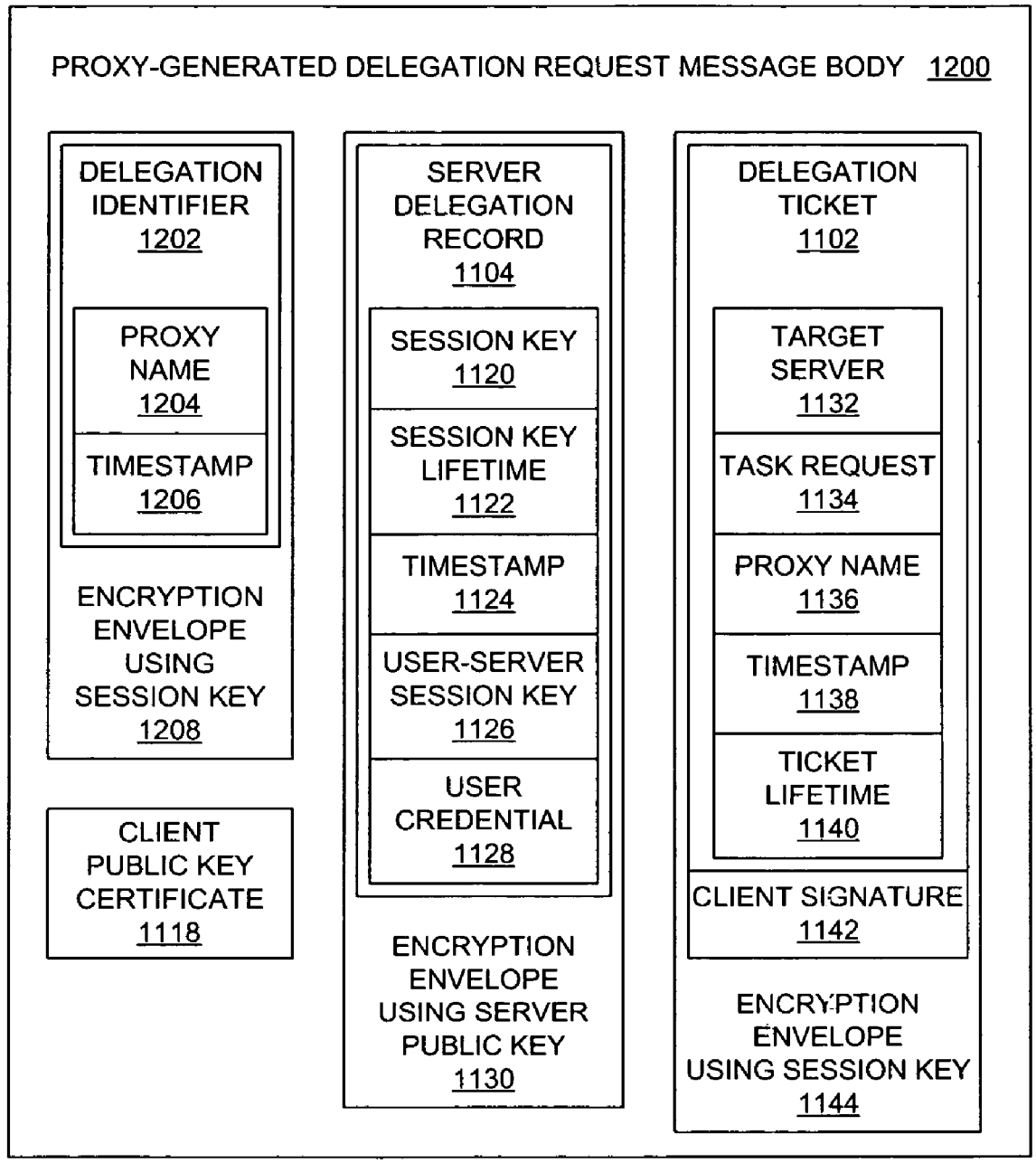
FIG. 12 depicts a block diagram that shows a proxy-agent-generated delegation request message containing a delegation ticket and other information for accomplishing a PKI-based authority delegation process in accordance with a third embodiment of the present invention.

The present invention provides assurance to target server 1006 that proxy agent 1004 is the entity that client 1002 has intended to act as the delegated agent; in other words, the present invention provides assurance to target server 1006 that proxy agent 1004 is not a malicious entity that is attempting to impersonate the proper delegated agent that was intended by client 1002, e.g., an entity that is trying to engage in a man-in-the-middle scheme or a replay scheme. This assurance is provided by having proxy agent 1004 include proof-of-delegation data 1030 in proxy-generated delegation request message 1010; the proof-of-delegation data 1030 is obtained from delegation ticket 1012, which is protected by encryption with the session key. Since only proxy agent 1004 should have a copy of the private key that was necessary to obtain session key 1024, only proxy agent 1004 should have a copy of the session key, which is necessary to obtain proof-of-delegation data 1030; this is further emphasized by having proxy agent 1004 encrypt proof-of-delegation data 1030 using session key 1024, which is shown in FIG. 10 with encryption envelope 1032. Moreover, encryption envelope 1032 continues to protect proof-of-delegation data 1030 such that it remains hidden and is not available as clear text within proxy-generated delegation request message 1010. Although any data item from the delegation ticket may be used for proof-of-delegation data 1030, FIG. 12 illustrates an example of the use of proof-of-delegation data by using the proxy name that is included within the delegation ticket.

Figure 11:
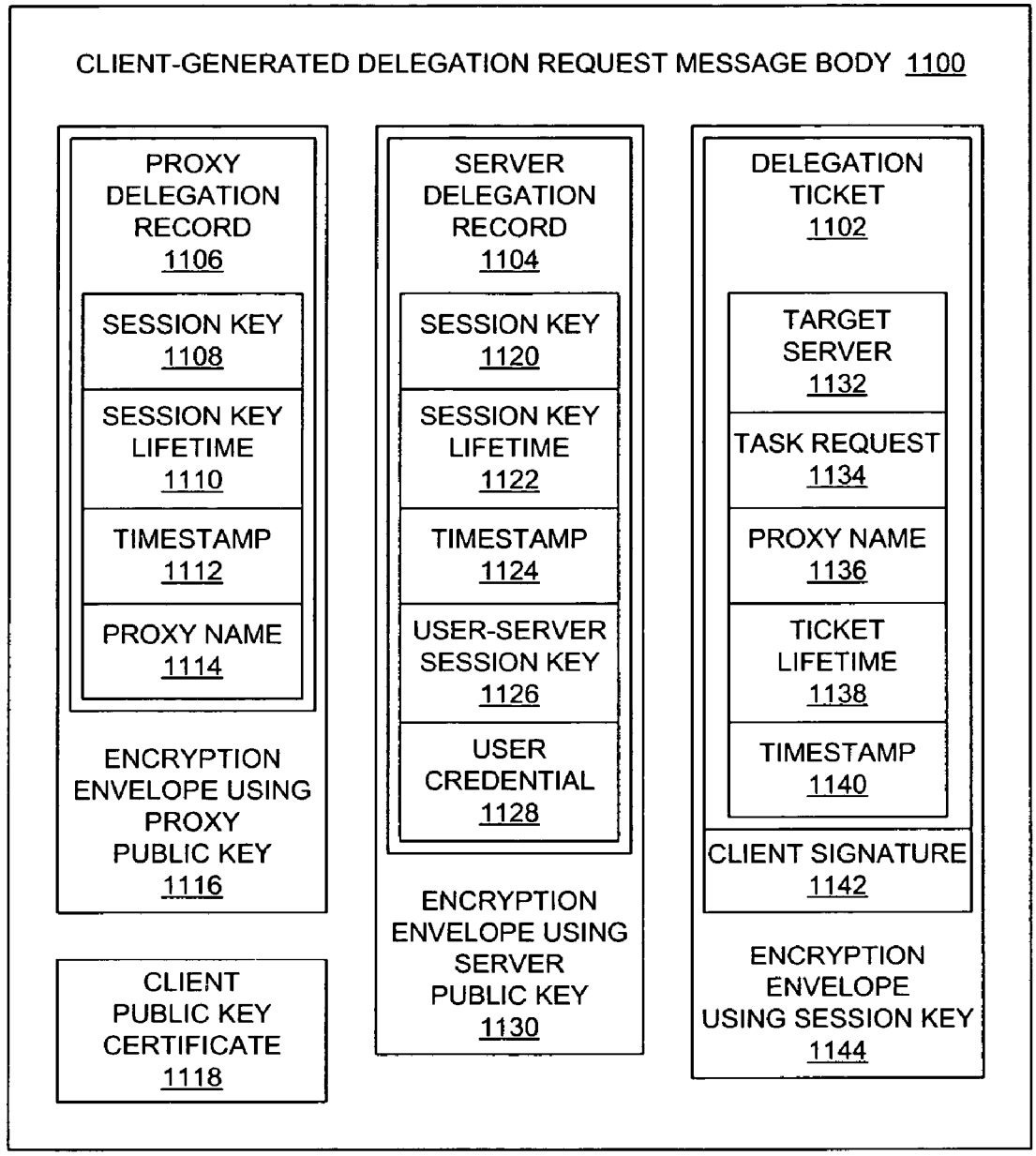
FIG. 11 depicts a block diagram that shows a client-generated delegation request message containing a delegation ticket and other information for accomplishing a PKI-based authority delegation process in accordance with a third embodiment of the present invention.

With reference now to FIG. 11, a block diagram depicts a client-generated delegation request message containing a delegation ticket and other information for accomplishing a PKI-based authority delegation process in accordance with a third embodiment of the present invention. Client-generated delegation request message body 1100 is contained within a client-generated delegation request message that is sent from a client to a proxy agent to initiate an authority delegation process, e.g., in a manner that is similar to that discussed above with respect to FIG. 10; FIG. 11 provides further detail for the information that is transferred from the client to the proxy agent during a delegation request operation in accordance with a third embodiment of the present invention.

Client-generated delegation request message body 1100 contains multiple data items: delegation ticket 1102, server delegation record 1104, and proxy delegation record 1106. Information within proxy delegation record 1106 is to be extracted and used by the proxy agent, and information within server delegation record 1104 is to be extracted and used by the target server. Information within delegation ticket 1102 can be extracted and used by both the proxy agent and the target server, which differs from the first and second embodiments of the present invention that were discussed above.

Data items 1108-1114 are bundled into proxy delegation record 1106, which is encrypted with the proxy agent's public key, as shown by the inclusion of encryption envelope 1116 that has been created with the proxy agent's public key. Session key 1108 is a symmetric cryptographic key or secret key that is generated by the client to be used bidirectionally for communications between the client and the proxy and between the proxy and the server after establishing the authority delegation; if the client has not included another user-server session key in the server delegation record, which is discussed hereinbelow, then session key 1108 is also used bidirectionally for communications between the client and the target server after establishing the authority delegation. Session key lifetime value 1110 is a time value that restricts the usable time period of session key 1108. Timestamp 1112 reflects a current time value, i.e. the time when the message is generated, which in conjunction with session key lifetime value 1110 allows an entity to determine the time at which session key 1108 expires. Alternatively, a session key may comprise a data bundle that includes other information, such as a key type (e.g., DES, triple DES, etc.).

Proxy name 1114 identifies the proxy to which authority is being delegated, i.e. the proxy agent that will act on behalf of the client/user; proxy name 1114 may contain an identifier for the proxy agent, e.g., the subject name for the proxy agent that would be found within the proxy agent's public key certificate. Although the proxy agent may be expected to know its own identifier, proxy name 1114 ensures that the proxy agent is using the same identifier as the client because proxy name 1114 might be one of many possible identifiers; it should also be noted that proxy name 1114 may be included for convenience because the proxy agent may also obtain a copy of the proxy name from delegation ticket 1102. Hence, session key 1108 is essential within proxy delegation record 1106, while the other data items are not essential.

Client-generated delegation request message body 1100 may contain certificate 1118, which is a copy of the client's/user's public key certificate; this may also be included for convenience since the proxy agent may be able to retrieve a copy of the client's/user's public key certificate from a public source, e.g., an LDAP directory that is commonly used by the proxy agent and the client.

As mentioned above, information within server delegation record 1104 is to be extracted and used by the target server. Data items 1120-1128 are bundled into server delegation record 1104, which is encrypted with the target server's public key, as shown by the inclusion of encryption envelope 1130 that has been created with the server's public key.

Session key 1120 is a copy of the session key that is identical to session key 1108. Likewise, session key lifetime value 1122 is a copy of the session key lifetime that is identical to session key lifetime 1110, and timestamp 1124 is a copy of the timestamp that is identical to timestamp 1112. Thus, the client has included two copies of the session key: one copy in server delegation record 1104 and one copy in proxy delegation record 1106; each copy of the session key is encrypted such that only the intended recipient may obtain its copy of the session key.

Session key 1120 is a symmetric cryptographic key or secret key that is generated by the client to be used bidirectionally for communications between the client and the proxy and between the proxy and the server after establishing the authority delegation. However, the client may include user-server session key 1126 in server delegation record 1104; if provided, user-server session key 1126 may be used to protect bidirectional communication between the client and the target server such that the proxy agent is not able to listen to those communications. User credential 1128 may be included in server delegation record 1104; user credential 1128, such as a username and associated password or similar authentication credential, may be used by the target server during an authentication operation to provide an extra level of security.

Client-generated delegation request message body 1100 also contains several data items 1132-1140 embedded in delegation ticket 1102, which is to be extracted and used by the target server. Delegation ticket 1102 is signed by the client, as shown by the inclusion of the client's digital signature 1142. Delegation ticket 1102 is encrypted with the session key, such as session key 1108/1120, as shown by the inclusion of encryption envelope 1144 that has been created with the session key; alternatively, the delegation ticket could be encrypted and then signed rather than being signed and then encrypted as shown in FIG. 11.

Target server 1132 identifies a particular server with respect to which the proxy agent will perform the delegated task. Task request 1134 informs the proxy agent and/or the target server about the type of task that the client is requesting that the proxy agent or the target server to perform on behalf of the client and for which the client is delegating authority to the proxy; if task request 1134 is not present in delegation request message body 1100, the client may subsequently specify the tasks that are to be performed. The client and the proxy agent may subsequently communicate to identify additional tasks and target resources that are to be processed within a given delegation session.

Proxy name 1136 identifies the proxy to which authority is being delegated, i.e. the proxy agent that will act on behalf of the client/user; proxy name 1136 may contain an identifier for the proxy agent, e.g., the subject name for the proxy agent that would be found within the proxy agent's public key certificate. Ticket lifetime 1138 is a time value that restricts the usable time period of the delegation of authority which, in conjunction with timestamp 1140, allows an entity to determine the time at which the delegation period expires, i.e. the validity period of delegation ticket 1102.

With reference now to FIG. 12, a block diagram depicts a proxy-agent-generated delegation request message containing a delegation ticket and other information for accomplishing a PKI-based authority delegation process in accordance with a third embodiment of the present invention. Proxy-agent-generated delegation request message body 1200 is contained within a proxy-generated request message that is sent from a proxy agent to a server to continue an authority delegation process that has been initiated by a client. Proxy-generated delegation request message body 1200 contains some information that has been copied or carried over from a client-generated delegation request message body that would have been received by a proxy agent from a client, e.g., such as client-generated delegation request message body 1100 that is shown in FIG. 11. This information was intended to be sent by the client to the target server as the destination for extraction and use by the target server. More specifically, proxy-generated delegation request message body 1200 contains delegation ticket 1102 and server delegation record 1104; several data items may be embedded in each object that were created by a client. Proxy-generated delegation request message body 1200 may also contain client public key certificate 1118. Hence, similar reference numerals that are shown in proxy-generated delegation request message body 1200 refer to similar data items that were described above with respect to client-generated delegation request message body 1100.

In addition, proxy-generated delegation request message body 1200 contains other data items that are generated by the proxy agent for use by the target server. In particular, delegation identifier 1202 contains an identifier or proxy name 1204 for the proxy agent, which should match the identifier for the proxy agent that has been used within proxy name 1136 in delegation ticket 1102, e.g., the subject name for the proxy agent that would be found within the proxy agent's public key certificate. Timestamp 1206 is optionally included to prevent a replay attack. Delegation identifier 1202 is encrypted by the proxy agent using session key 1108 that the proxy agent has received from the client in client-generated delegation request message body 1100, as shown by the inclusion of encryption envelope 1208 that has been created with the session key. Delegation identifier 1202 acts as proof-of-delegation data as explained hereinabove with respect to FIG. 10.

The client, the proxy agent, and the target server may exchange messages as described above with respect to FIG. 11 and FIG. 12 when a client/user entity is attempting to delegate authority to a proxy agent that is to act on behalf of the client/user with respect a target server; if the authority delegation process is successfully completed, then the server accepts and processes transaction requests from the proxy agent. As noted above, the process that is shown in FIG. 7A and FIG. 7B assumes the usage of examples of a delegation request message body as shown in FIG. 5 and FIG. 6 with respect to a first embodiment of the present invention, but a similar process would be used for alternative embodiments, e.g., using the examples of a delegation request message body as shown in FIG. 11 and FIG. 12 as described hereinbelow with respect to a third embodiment of the present invention.

Figure 13A:
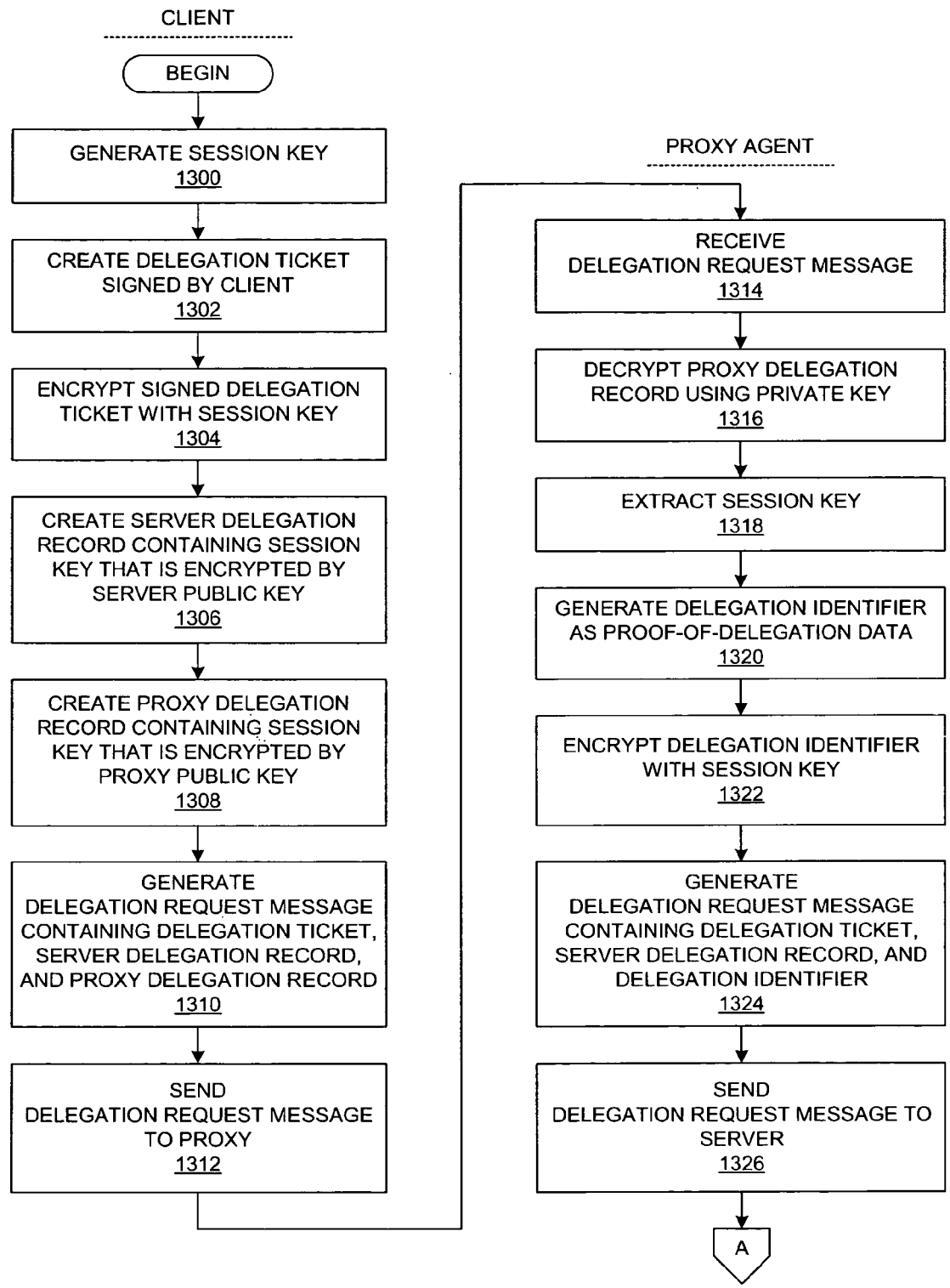
FIGS. 13A-13B depicts a flowchart that shows a PKI-based authority delegation process in accordance with a third embodiment of the present invention.
Figure 13B:
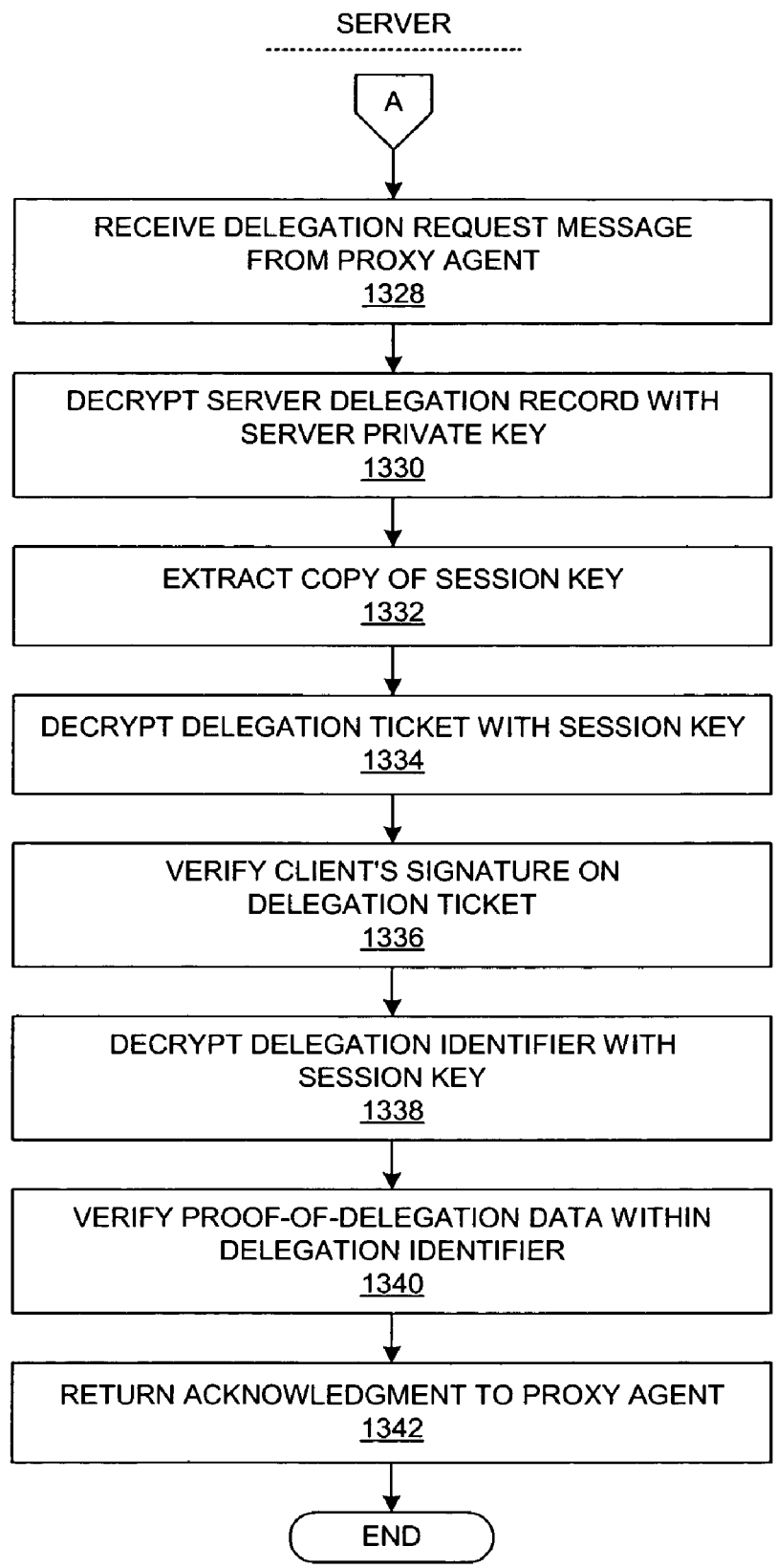

With reference now to FIGS. 13A-13B, a flowchart depicts a PKI-based authority delegation process in accordance with a third embodiment of the present invention. The process that is shown in FIG. 13A and FIG. 13B depicts a client/user entity that is attempting to delegate authority to a proxy agent that is to act on behalf of the client/user with respect to a target server. The process that is shown in FIG. 13A and FIG. 13B assumes the usage of examples of a delegation request message body as shown in FIG. 11 and FIG. 12. If the authority delegation process is successfully completed, then the server accepts and processes transaction requests from the proxy agent. In FIG. 13A and FIG. 13B, a delegation request message body would be included as part of a message that may have other parts, as described above.

The process commences when the client generates a session key (step 1300) and creates a delegation ticket that is signed by the client (step 1302), after which the client encrypts the delegation ticket with the session key (step 1304). The client creates a server delegation record that contains a copy of the session key and is encrypted with the server's public key (step 1306). The client also creates a proxy delegation record that contains a copy of the session key and is encrypted with the proxy public key (step 1308). The client then generates a delegation request message that contains the signed and encrypted delegation ticket, the encrypted server delegation record, and the encrypted proxy delegation record (step 1310), e.g., as shown in client-generated delegation request message body 1200 that is depicted in FIG. 12. The client then sends the delegation request message to the proxy agent (step 1312).

After the proxy agent receives the delegation request message (step 1314), the proxy agent decrypts the proxy delegation record using its private key (step 1316). Assuming that the decryption was successful, the proxy agent extracts the session key and possibly other information from the proxy delegation record (step 1318). The proxy agent then generates a delegation identifier that comprises proof-of-delegation data (step 1320) and encrypts the delegation identifier with the session key that was received from the client (step 1322). The proxy agent bundles the encrypted delegation identifier with the encrypted server delegation record and the signed and encrypted delegation ticket into a delegation request message (step 1324), which is sent to the target server (step 1326).

After the server receives the delegation request message from the proxy agent (step 1328), the server decrypts the encrypted server delegation record with the server's private key (step 1330) and extracts a copy of the session key from the server delegation record (step 1332). The server then decrypts the delegation ticket using the extracted session key (step 1334) and verifies the client's digital signature on the delegation ticket (step 1336). The server may also check that the ticket lifetime is valid and that the task request is valid; other included information may be validated as necessary.

Assuming that the data items within the delegation ticket are successfully validated, the server also decrypts the delegation identifier using the previously extracted session key (step 1338). The server then verifies the delegation identifier (step 1340), which entails verifying that the proxy agent has included proof-of-delegation data; e.g., the server verifies that the proxy name in the delegation identifier matches the proxy name in the delegation ticket. Assuming that the server determines that the client and the proxy agent have successfully interacted to produce the delegation identifier, then the server returns to the proxy agent some data that has been encrypted with the session key as an acknowledgment or continuation of the requested transaction (step 1342), thereby concluding the process.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for delegating authority from a delegating agent to a delegated agent to authorize the delegated agent to act on behalf of the delegating agent with respect to a recognizing agent in order to enable the delegated agent to access computational resources through the recognizing agent, the method comprising:

generating, by the delegating agent, a delegation ticket contained a first delegated agent identifier and a first copy of a session key, wherein the delegation ticket is encrypted for the recognizing agent;

generating, by the delegating agent, a first message containing the delegation ticket and a second copy of the session key, wherein the first message is encrypted for the delegated agent; and transmitting the first message from the delegating agent to the delegated agent decrypting, by the delegated agent, the first message to extract the second copy of the session key and the delegation ticket;

encrypting, by the delegated agent, a second delegated agent identifier with the second copy of the session key to create an encrypted second delegated agent identifier;

generating, by the delegated agent, a second message containing the delegation ticket and the encrypted second delegated agent identifier, wherein the second message is encrypted for the recognizing agent; and transmitting the second message from the delegated agent to the recognizing agent.

2. The method of claim 1 further comprising:

decrypting, by the recognizing agent, the second message to extract the encrypted second delegated agent identifier and the delegation ticket;

decrypting, by the recognizing agent, the delegation ticket;

extracting, by the recognizing agent, the first copy of the session key, from the delegation ticket and the first delegated agent identifier;

decrypting the encrypted second delegated agent identifier using the first copy of the session key; and in response to a determination that the first delegated agent identifier and the second delegated agent identifier are identical, sending data that has been encrypted with the session key from the recognizing agent to the delegated agent.

3. A method for delegating authority from a delegating agent to a delegated agent to authorize the delegated agent to act on behalf of the delegating agent with respect to a recognizing agent in order to enable the delegated agent to access computational resources through the recognizing agent, the method comprising:

receiving a signed encrypted first message at the delegated agent from the delegating agent, wherein the signed encrypted first message has been signed by the delegating agent and encrypted with a public key of the delegated agent, wherein the first message contains a second copy of a session key and a delegation ticket, and wherein the delegation ticket contains a first copy of the session key and a first identifier for the delegated agent;

extracting a signed encrypted delegation ticket and a second copy of the session key from the first message at the delegated agent after decrypting the signed encrypted first message with a private key of the delegated agent and verifying a digital signature by the delegating agent on the signed encrypted first message;

generating a delegation identifier at the delegated agent, wherein the delegation identifier contains a second identifier that identifies the delegated agent;

creating an encrypted delegation identifier by encrypting the delegation identifier with the second copy of the session key at the delegated agent;

generating a second message at the delegated agent, wherein the second message contains the encrypted delegation identifier and the signed encrypted delegation ticket;

creating a signed encrypted second message at the delegated agent by encrypting the second message with a public key of the recognizing agent and by signing the second message such that the signed encrypted second message includes a digital signature by the delegated agent; and sending the signed encrypted second message from the delegated agent to the recognizing agent.

4. A method for delegating authority from a delegating agent to a delegated agent to authorize the delegated agent to act on behalf of the delegating agent with respect to a recognizing agent in order to enable the delegated agent to access computational resources through the recognizing agent, the method comprising:

receiving a signed encrypted message at the recognizing agent from the delegated agent;

extracting a signed encrypted delegation ticket and an encrypted delegation identifier from the message at the recognizing agent after decrypting the signed encrypted message with a private key of the recognizing agent and verifying a digital signature by the delegated agent on the signed encrypted message;

extracting a copy of a session key and a first identifier that identifies the delegated agent from the delegation ticket at the recognizing agent after decrypting the signed encrypted delegation ticket with a private key of the recognizing agent and verifying a digital signature by the delegating agent on the signed encrypted delegation ticket;

obtaining a delegation identifier by decrypting an encrypted delegation identifier with the copy of the session key at the delegated agent;

comparing a second identifier from the delegation identifier with the first identifier from the delegation ticket; and in response to a determination that the first identifier and the second identifier are identical, sending data that has been encrypted with the session key from the recognizing agent to the delegated agent.

5. A method for delegating authority from a delegating agent to a delegated agent to authorize the delegated agent to act on behalf of the delegating agent with respect to a recognizing agent in order to enable the delegated agent to access computational resources through the recognizing agent, the method comprising:

generating a delegation ticket at the delegating agent, wherein the delegation ticket contains a first copy of a session key and a first identifier that identifies the delegated agent;

creating a signed encrypted delegation ticket at the delegating agent by encrypting the delegation ticket with a public key of the recognizing agent and by signing the delegation ticket such that the signed encrypted delegation ticket includes a first digital signature by the delegating agent;

generating a first message at the delegating agent, wherein the first message contains the signed encrypted delegation ticket and a second copy of the session key;

creating a signed encrypted first message at the delegating agent by encrypting the first message with a public key of the delegated agent and by signing the first message such that the signed encrypted first message includes a second digital signature by the delegating agent;

sending the signed encrypted first message from the delegating agent to the delegated agent;

receiving the signed encrypted first message at the delegated agent from the delegating agent;

extracting the signed encrypted delegation ticket and the second copy of the session key from the first message at the delegated agent after decrypting the signed encrypted first message with a private key of the delegated agent and verifying the second digital signature on the signed encrypted first message;

generating a delegation identifier at the delegated agent, wherein the delegation identifier contains a second identifier that identifies the delegated agent;

creating an encrypted delegation identifier by encrypting the delegation identifier with the second copy of the session key at the delegated agent;

generating a second message at the delegated agent, wherein the second message contains the encrypted delegation identifier and the signed encrypted delegation ticket;

creating a signed encrypted second message at the delegated agent by encrypting the second message with a public key of the recognizing agent and by signing the second message such that the signed encrypted second message includes a third digital signature by the delegated agent;

sending the signed encrypted second message from the delegated agent to the recognizing agent;

receiving the signed encrypted second message at the recognizing agent from the delegated agent;

extracting the signed encrypted delegation ticket and the encrypted delegation identifier from the second message at the recognizing agent after decrypting the signed encrypted second message with a private key of the recognizing agent and verifying the third digital signature on the signed encrypted second message;

extracting the first copy of the session key and the first identifier that identifies the delegated agent from the delegation ticket at the recognizing agent after decrypting the signed encrypted delegation ticket with a private key of the recognizing agent and verifying the first digital signature on the signed encrypted delegation ticket;

obtaining the delegation identifier by decrypting the encrypted delegation identifier with the first copy of the session key at the delegated agent;

comparing the second identifier from the delegation identifier with the first identifier from the delegation ticket;

in response to a determination that the first identifier and the second identifier are identical, sending data that has been encrypted with the session key from the recognizing agent to the delegated agent.

6. A method for delegating authority from a delegating agent to a delegated agent to authorize the delegated agent to act on behalf of the delegating agent with respect to a recognizing agent in order to enable the delegated agent to access computational resources through the recognizing agent, the method comprising:

generating a session key;

generating an encrypted delegation ticket that has been encrypted with the session key; generating a first encrypted session key that has been encrypted with a public key of the recognizing agent;

generating a second encrypted session key that has been encrypted with a public key of the delegated agent;

generating a first message containing the encrypted delegation ticket, the first encrypted session key, and the second encrypted session key; and transmitting the first message from the delegating agent to the delegated agent receiving the first message at the delegated agent from the delegating agent;

decrypting, by the delegated agent, the second encrypted session key with a private key of the delegated agent to obtain a copy of the session key;

encrypting, by the delegated agent, data from the delegation ticket with the session key to generate an encrypted proof-of-delegation data item;

generating, by the delegated agent, a second message containing the encrypted delegation ticket, the first encrypted session key, and the encrypted proof-of-delegation data item; and transmitting the second message from the delegated agent to the recognizing agent.

7. The method of claim 6 further comprising:

receiving the second message at the recognizing agent from the delegated agent;

decrypting, by the recognizing agent, the first encrypted session key with a private key of the recognizing agent to obtain a copy of the session key;

decrypting, by the recognizing agent, the encrypted delegation ticket with the session key to generate the delegation ticket;

decrypting, by the recognizing agent, the encrypted proof-of-delegation data item with the session key to generate the proof-of-delegation data item; and in response to a determination that the proof-of-delegation data item is identical to data within the delegation ticket, sending data that has been encrypted with the session key from the recognizing agent to the delegated agent.

8. The method of claim 6 further comprising:

performing transactions at the recognizing agent for the delegating agent, wherein the recognizing agent uses the session key to encrypt data that is transmitted from the recognizing agent to the delegated agent.

9. The method of claim 6 further comprising:

generating, by the delegating agent, a second session key; generating an encrypted second session key that has been encrypted with a public key of the recognizing agent; and transferring the encrypted second session key from the delegating agent to the recognizing agent.

10. The method of claim 9 further comprising:

performing transactions at the recognizing agent for the delegating agent, wherein the recognizing agent uses the second session key to encrypt data that is transmitted from the recognizing agent via the delegated agent to the delegating agent.

11. The method of claim 6 further comprising:

generating, by the delegating agent, an encrypted user credential that has been encrypted with a public key of the recognizing agent; and sending the encrypted user credential from the delegating agent within the first message.

12. The method of claim 11 further comprising:

decrypting the encrypted user credential at the recognizing agent with a private key of the recognizing agent to generate a copy of the user credential; and performing an authentication operation at the recognizing agent using the user credential.

13. A non-transitory computer program product on a computer-readable medium for use in a data processing system for delegating authority from a delegating agent to a delegated agent to authorize the delegated agent to act on behalf of the delegating agent with respect to a recognizing agent in order to enable the delegated agent to access computational resources through the recognizing agent, the computer program product comprising instructions for:

generating, by the delegating agent, a delegation ticket contained a first delegated agent identifier and a first copy of a session key, wherein the delegation ticket is encrypted for the recognizing agent;

generating, by the delegating agent, a first message containing the delegation ticket and a second copy of the session key, wherein the first message is encrypted for the delegated agent; and transmitting the first message from the delegating agent to the delegated agent decrypting, by the delegated agent, the first message to extract the second copy of the session key and the delegation ticket;

encrypting, by the delegated agent, a second delegated agent identifier with the second copy of the session key to create an encrypted second delegated agent identifier;

generating, by the delegated agent, a second message containing the delegation ticket and the encrypted second delegated agent identifier, wherein the second message is encrypted for the recognizing agent; and transmitting the second message from the delegated agent to the recognizing agent.

14. The computer program product of claim 13 further comprising instructions for:

decrypting, by the recognizing agent, the second message to extract the encrypted second delegated agent identifier and the delegation ticket;

decrypting, by the recognizing agent, the delegation ticket;

extracting, by the recognizing agent, the first copy of the session key from the delegation ticket and the first delegated agent identifier;

decrypting the encrypted second delegated agent identifier using the first copy of the session key;

sending, in response to a determination that the first delegated agent identifier and the second delegated agent identifier are identical, data that has been encrypted with the session key from the recognizing agent to the delegated agent.

15. A non-transitory computer program product on a computer-readable medium for use in a data processing system for delegating authority from a delegating agent to a delegated agent to authorize the delegated agent to act on behalf of the delegating agent with respect to a recognizing agent in order to enable the delegated agent to access computational resources through the recognizing agent, the computer program product comprising instructions for:

receiving a signed encrypted first message at the delegated agent from the delegating agent, wherein the signed encrypted first message has been signed by the delegating agent and encrypted with a public key of the delegated agent, wherein the first message contains a second copy of a session key and a delegation ticket, and wherein the delegation ticket contains a first copy of the session key and a first identifier for the delegated agent;

extracting a signed encrypted delegation ticket and a second copy of the session key from the first message at the delegated agent after decrypting the signed encrypted first message with a private key of the delegated agent and verifying a digital signature by the delegating agent on the signed encrypted first message;

generating a delegation identifier at the delegated agent, wherein the delegation identifier contains a second identifier that identifies the delegated agent;

creating an encrypted delegation identifier by encrypting the delegation identifier with the second copy of the session key at the delegated agent;

generating a second message at the delegated agent, wherein the second message contains the encrypted delegation identifier and the signed encrypted delegation ticket; means for creating a signed encrypted second message at the delegated agent by encrypting the second message with a public key of the recognizing agent and by signing the second message such that the signed encrypted second message includes a digital signature by the delegated agent; and sending the signed encrypted second message from the delegated agent to the recognizing agent.

16. A non-transitory computer program product on a computer-readable medium for use in a data processing system for delegating authority from a delegating agent to a delegated agent to authorize the delegated agent to act on behalf of the delegating agent with respect to a recognizing agent in order to enable the delegated agent to access computational resources through the recognizing agent, the computer program product comprising instructions for:

receiving a signed encrypted message at the recognizing agent from the delegated agent;

extracting a signed encrypted delegation ticket and an encrypted delegation identifier from the message at the recognizing agent after decrypting the signed encrypted message with a private key of the recognizing agent and verifying a digital signature by the delegated agent on the signed encrypted message;

extracting a copy of a session key and a first identifier that identifies the delegated agent from the delegation ticket at the recognizing agent after decrypting the signed encrypted delegation ticket with a private key of the recognizing agent and verifying a digital signature by the delegating agent-on the signed encrypted delegation ticket;

obtaining a delegation identifier by decrypting an encrypted delegation identifier with the copy of the session key at the delegated agent;

comparing a second identifier from the delegation identifier with the first identifier from the delegation ticket; and sending, in response to a determination that the first identifier and the second identifier are identical, data that has been encrypted with the session key from the recognizing agent to the delegated agent.

17. A non-transitory computer program product on a computer-readable medium for use in a data processing system for delegating authority from a delegating agent to a delegated agent to authorize the delegated agent to act on behalf of the delegating agent with respect to a recognizing agent in order to enable the delegated agent to access computational resources through the recognizing agent, the computer program product comprising instructions for:

generating a delegation ticket at the delegating agent, wherein the delegation ticket contains a first copy of a session key and a first identifier that identifies the delegated agent;

creating a signed encrypted delegation ticket at the delegating agent by encrypting the delegation ticket with a public key of the recognizing agent and by signing the delegation ticket such that the signed encrypted delegation ticket includes a first digital signature by the delegating agent;

generating a first message at the delegating agent, wherein the first message contains the signed encrypted delegation ticket and a second copy of the session key;

creating a signed encrypted first message at the delegating agent by encrypting the first message with a public key of the delegated agent and by signing the first message such that the signed encrypted first message includes a second digital signature by the delegating agent;

sending the signed encrypted first message from the delegating agent to the delegated agent;

receiving the signed encrypted first message at the delegated agent from the delegating agent;

extracting the signed encrypted delegation ticket and the second copy of the session key from the first message at the delegated agent after decrypting the signed encrypted first message with a private key of the delegated agent and verifying the second digital signature on the signed encrypted first message;

generating a delegation identifier at the delegated agent, wherein the delegation identifier contains a second identifier that identifies the delegated agent;

creating an encrypted delegation identifier by encrypting the delegation identifier with the second copy of the session key at the delegated agent;

generating a second message at the delegated agent, wherein the second message contains the encrypted delegation identifier and the signed encrypted delegation ticket;

creating a signed encrypted second message at the delegated agent by encrypting the second message with a public key of the recognizing agent and by signing the second message such that the signed encrypted second message includes a third digital signature by the delegated agent;

sending the signed encrypted second message from the delegated agent to the recognizing agent; means for receiving the signed encrypted second message at the recognizing agent from the delegated agent;

extracting the signed encrypted delegation ticket and the encrypted delegation identifier from the second message at the recognizing agent after decrypting the signed encrypted second message with a private key of the recognizing agent and verifying the third digital signature on the signed encrypted second message;

extracting the first copy of the session key and the first identifier that identifies the delegated agent from the delegation ticket at the recognizing agent after decrypting the signed encrypted delegation ticket with a private key of the recognizing agent and verifying the first digital signature on the signed encrypted delegation ticket;

obtaining the delegation identifier by decrypting the encrypted delegation identifier with the first copy of the session key at the delegated agent;

comparing the second identifier from the delegation identifier with the first identifier from the delegation ticket;

sending, in response to a determination that the first identifier and the second identifier are identical, data that has been encrypted with the session key from the recognizing agent to the delegated agent.

18. A non-transitory computer program product on a computer-readable medium for use in a data processing system for delegating authority from a delegating agent to a delegated agent to authorize the delegated agent to act on behalf of the delegating agent with respect to a recognizing agent in order to enable the delegated agent to access computational resources through the recognizing agent, the computer program product comprising instructions for:

generating a session key;

generating an encrypted delegation ticket that has been encrypted with the session key;

generating a first encrypted session key that has been encrypted with a public key of the recognizing agent;

generating a second encrypted session key that has been encrypted with a public key of the delegated agent;

generating a first message containing the encrypted delegation ticket, the first encrypted session key, and the second encrypted session key; and transmitting the first message from the delegating agent to the delegated agent receiving the first message at the delegated agent from the delegating agent;

decrypting, by the delegated agent, the second encrypted session key with a private key of the delegated agent to obtain a copy of the session key;

encrypting, by the delegated agent, data from the delegation ticket with the session key to generate an encrypted proof-of-delegation data item;

generating, by the delegated agent, a second message containing the encrypted delegation ticket, the first encrypted session key, and the encrypted proof-of-delegation data item; and transmitting the second message from the delegated agent to the recognizing agent.

19. The computer program product of claim 17 further comprising instructions for:

receiving the second message at the recognizing agent from the delegated agent; means for decrypting, by the recognizing agent, the first encrypted session key with a private key of the recognizing agent to obtain a copy of the session key;

decrypting, by the recognizing agent, the encrypted delegation ticket with the session key to generate the delegation ticket;

decrypting, by the recognizing agent, the encrypted proof-of-delegation data item with the session key to generate the proof-of-delegation data item; and sending, in response to a determination that the proof-of-delegation data item is identical to data within the delegation ticket, data that has been encrypted with the session key from the recognizing agent to the delegated agent.

20. The computer program product of claim 18 further comprising instructions for:

performing transactions at the recognizing agent for the delegating agent, wherein the recognizing agent uses the session key to encrypt data that is transmitted from the recognizing agent to the delegated agent.

21. The computer program product of claim 18 further comprising instructions for:

generating, by the delegating agent, a second session key;

generating an encrypted second session key that has been encrypted with a public key of the recognizing agent; and transferring the encrypted second session key from the delegating agent to the recognizing agent.

22. The computer program product of claim 21 further comprising instructions for:

performing transactions at the recognizing agent for the delegating agent, wherein the recognizing agent uses the second session key to encrypt data that is transmitted from the recognizing agent via the delegated agent to the delegating agent.

23. The computer program product of claim 18 further comprising instructions for:

generating, by the delegating agent, an encrypted user credential that has been encrypted with a public key of the recognizing agent; and means for sending the encrypted user credential from the delegating agent within the first message.

24. The computer program product of claim 23 further comprising instructions for:

decrypting the encrypted user credential at the recognizing agent with a private key of the recognizing agent to generate a copy of the user credential; and performing an authentication operation at the recognizing agent using the user credential.

* * * * *